(12) United States Patent
Tomita et al.

(10) Patent No.: US 7,804,607 B2
(45) Date of Patent: Sep. 28, 2010

(54) GROUP PRINTER FOR MULTIPLE MEMBER PRINTERS

(75) Inventors: Makoto Tomita, Kanagawa (JP);
Shigeki Kuroda, Kanagawa (JP);
Hidekazu Morooka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1358 days.

(21) Appl. No.: 10/241,572

(22) Filed: Sep. 12, 2002

(65) Prior Publication Data

US 2003/0053082 A1 Mar. 20, 2003

(30) Foreign Application Priority Data

Sep. 14, 2001 (JP) ............................. 2001-279596
Sep. 14, 2001 (JP) ............................. 2001-279597
Aug. 26, 2002 (JP) ............................. 2002-245282

(51) Int. Cl.
*G06F 3/12* (2006.01)
*G06K 15/00* (2006.01)

(52) U.S. Cl. .................. 358/1.13; 358/1.9; 358/1.12; 358/1.15; 358/1.18; 710/19

(58) Field of Classification Search ............... 358/1.15, 358/1.1, 1.2, 1.13; 710/8
See application file for complete search history.

(56) References Cited

U.S. PATENT DOCUMENTS

| | | | | |
|---|---|---|---|---|
| 5,754,218 A | * | 5/1998 | Baek et al. | 347/240 |
| 5,905,906 A | * | 5/1999 | Goffinet et al. | 710/8 |
| 5,991,846 A | * | 11/1999 | Ooki | 710/241 |
| 6,348,971 B2 | * | 2/2002 | Owa et al. | 358/1.15 |
| 6,369,909 B1 | * | 4/2002 | Shima | 358/1.15 |
| 6,411,398 B1 | * | 6/2002 | Inamine | 358/1.2 |
| 6,757,070 B1 | * | 6/2004 | Lin et al. | 358/1.1 |
| 6,762,852 B1 | * | 7/2004 | Fischer | 358/1.15 |
| 6,798,530 B1 | * | 9/2004 | Buckley et al. | 358/1.13 |
| 6,909,520 B2 | * | 6/2005 | Ogino | 358/1.15 |
| 6,967,728 B1 | * | 11/2005 | Vidyanand | 358/1.12 |
| 7,027,169 B1 | * | 4/2006 | Morikawa et al. | 358/1.14 |
| 2001/0024292 A1 | * | 9/2001 | Otake | 358/1.15 |
| 2002/0051204 A1 | * | 5/2002 | Ohara | 358/1.16 |
| 2002/0054302 A1 | * | 5/2002 | Nakamura | 358/1.2 |
| 2002/0054312 A1 | | 5/2002 | Tomita | 358/1.13 |
| 2002/0060805 A1 | | 5/2002 | Tomita | 358/1.15 |
| 2002/0163665 A1 | * | 11/2002 | Iwata et al. | 358/1.15 |
| 2002/0181013 A1 | * | 12/2002 | Dunlap | 358/1.15 |
| 2002/0184334 A1 | * | 12/2002 | Cherry et al. | 709/217 |
| 2003/0010818 A1 | * | 1/2003 | Asawaka | 235/379 |
| 2003/0046314 A1 | | 3/2003 | Morooka | 707/500 |
| 2003/0053105 A1 | | 3/2003 | Morooka et al. | 358/1.13 |
| 2003/0053106 A1 | | 3/2003 | Kuroda et al. | 358/1.13 |

FOREIGN PATENT DOCUMENTS

| | | |
|---|---|---|
| JP | 9-319533 | 12/1997 |
| JP | 11-232054 | 8/1999 |
| JP | 2000-010753 | 1/2000 |
| JP | 2000-259377 | 9/2000 |
| JP | 2001-290625 | 10/2001 |
| JP | 2002-023985 | 1/2002 |

* cited by examiner

*Primary Examiner*—Edward L Coles
*Assistant Examiner*—Vincent Rudolph
(74) *Attorney, Agent, or Firm*—Fitzpatrick, Cella, Harper & Scinto

(57) ABSTRACT

In an arrangement of printing set-up of a virtual printer, which is associated with a plurality of member printer drivers, the optimum user interface control is executed according to the arrangement of a plurality of member printer drivers.

12 Claims, 22 Drawing Sheets

FIG. 12

| PRINT JOB CONTROL METHOD | METHOD OF COMMON PRINTABLE RESOLUTION DECISION |
|---|---|
| PROXY PRINT | SAME AS MEMBER PRINTER WHO IS THE FIRST IN PROXY RANKING |
| DISPERSION PRINT | RESOLUTION COMMON TO ALL MEMBER PRINTERS |
| COLOR/MONOCHROME DISPERSION PRINT | RESOLUTION COMMON TO ALL MEMBER PRINTERS |
| BROADCAST PRINT | RESOLUTION COMMON TO ALL MEMBER PRINTERS |
| . . . | . . . |

FIG. 21

| PRINT JOB CONTROL METHOD | METHOD OF PRINTABLE RESOLUTION DECISION |
|---|---|
| PROXY PRINT | SAME AS REPRESENTATIVE PRINTER |
| DISPERSION PRINT | SELECT THE SMALLEST POSSIBLE RANGE |
| COLOR/MONOCHROME DISPERSION PRINT | SELECT THE SMALLEST POSSIBLE RANGE |
| BROADCAST PRINT | SELECT THE SMALLEST POSSIBLE RANGE |
| . . . | . . . |

FIG. 23

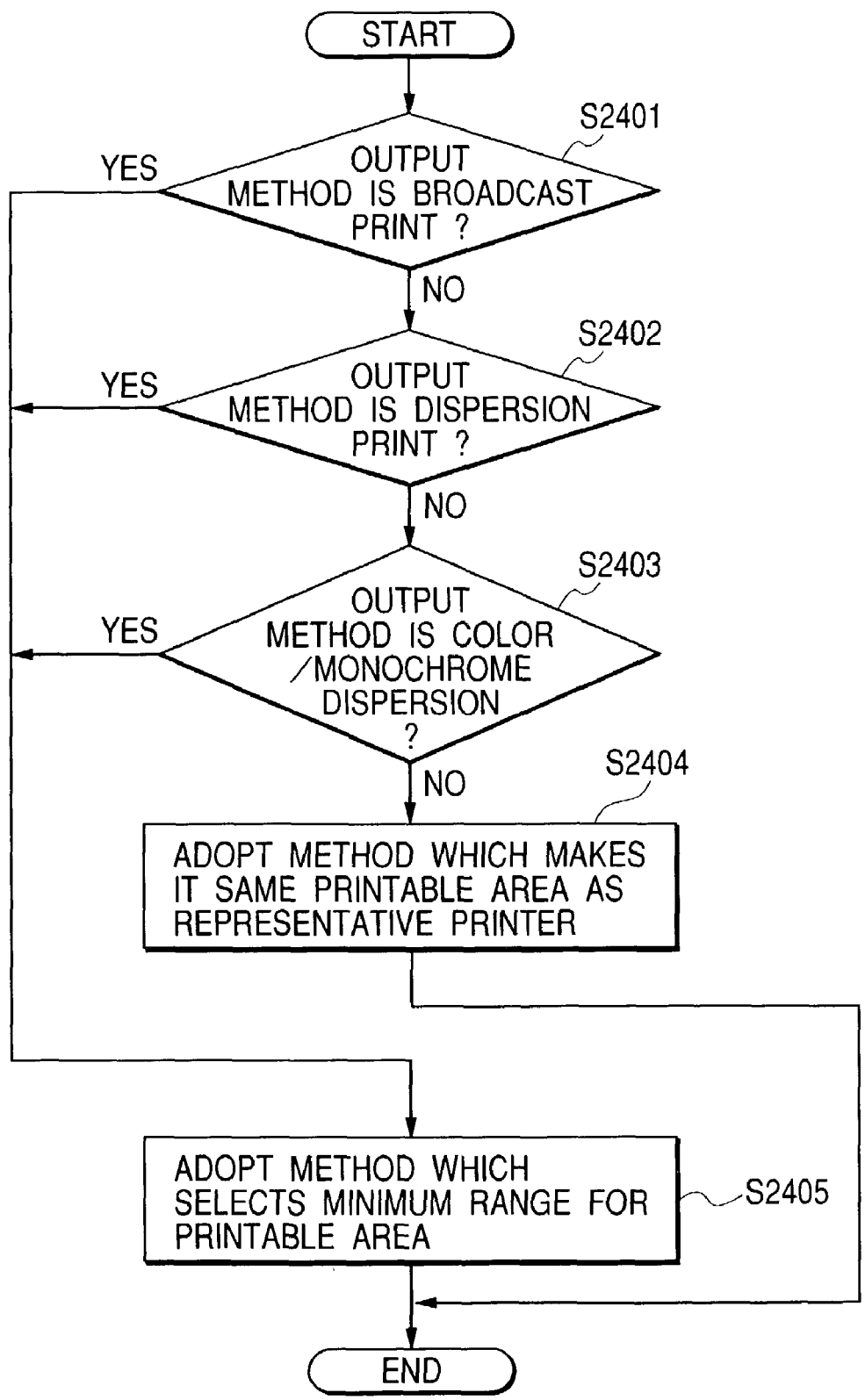

GROUP PRINTER FOR MULTIPLE MEMBER PRINTERS

BACKGROUND OF THE INVENTION

1. Field of the Invention

The present invention relates to a controller, which performs a printing processing corresponding to a draw command from an application, and a control method, and a program, which performs a printing data processing practicable by a computer, and a recording medium, which stores a program readable by a computer.

2. Related Background Art

In recent years, network equipment has been in general use, and a large number of personal computers (hereinafter, PC) and printers have come to be connected on a network. In such network surroundings, a printing job control system (dispersion printing system) has been known, wherein, when a printing is performed, with respect to a document having a number of pages or the document having a number of copies, a printing job is once spooled in order to attempt shortening of printing time, and every pages or every copies are dispersed to a plurality of printers, and are outputted.

Further, in such network surroundings, a printing job control system (color monochrome dispersion printing system) has been known, wherein, in order to attempt reduction of costs at printing time and shortening of printing time for one document where color pages and monochrome pages are intermingled, color pages are dispersed to a color printer and monochrome pages are dispersed to a monochrome printer, and are outputted.

Further, in such network surroundings, a printing job control system (broadcast printing system) has been known, wherein, by a single order, one document is simultaneously transmitted to a plurality of printers and printed.

Further, in such network surroundings, a printing control system (error proxy printing system) has been known, wherein, in the case where an error has developed on a printer for a document transmitted by the printer, the printer is automatically switched to another printer for printing.

However, in the case where, for example, the dispersion printing is performed via a printer driver, in order to perform a printing set-up in the dispersion printing, a complicated operation is required for the set-up of individual printers, and since the set-up is made one by one, it was difficult to have uniformity and consistence for the set-up of each printer (printer driver or device).

For example, speaking of a resolution, it is often the case that the ordinary printer has a function to correspond to several types of resolutions, and in the case where the printing process such as dispersion, broadcast, proxy and the like is performed by using a plurality of printers, there was a problem in that specifications with predetermined resolutions could not be designated by collective printing instructions.

For this reason, it was necessary to set printable resolution for individual printers or individual printer drivers, and this required complicated operations to perform the set-up separately.

On the other hand, in the case where the printing instruction to a plurality of connected printers is made via a virtual printer driver UI which brings together individual printers, when a printing is performed by matching a printing resolution suitable for a certain printer, there is a possibility that mismatching of printing resolution develops on other printer and lowers a print quality, and therefore, it was necessary for the user to check the printing resolution feasible for each printer and find and set the printing resolution, which can be set for all of the printers.

Further, speaking of a setting feasible area as another example, even when the printing is made on the same size paper, there are some cases where the setting feasible area printable by the printer is different depending on the printer to be used, and in the case where the printing such as dispersing, broadcast, proxy and the like was performed by using a plurality of printers by the printing job control system, there was no effective set-up method available for collective set-up so that normal printing output matter could be obtained by taking into consideration characteristics (setting feasible areas) peculiar to respective printers.

According to a conventional set-up method, the setting feasible areas of respective printers are checked so that the same printing area can be set for individual printers or individual drivers within a printable range by all of the printers. However, this necessitated complicated operations to perform the set-up separately.

Further, in the case where a set-up regarding a setting area such as a margin is set by one virtual printer driver which brings together respective printers, when the printing instruction is made by matching the setting area of a certain printer, there is a possibility that a lack of setting develops on other printer, and therefore, it was necessary after all for the user to check the setting feasible area of respective printers and find a range where a setting can be performed for all of the printers.

Further, in the case where the printing process by a virtual printer targeted at a plurality of printers is assumed, for example, a combination of a plurality of printers composing the virtual printer is sometimes changed accompanied with a change in a output method, and in order that the printing set-up is performed so as to be able to obtain the printing output matter having normalcy/uniformity for the combination of a plurality of printers changed in this way, according to the conventional arrangement, it was after all necessary for the user to check the printing set-up feasible items (printing capacity/printing function) and perform the set-up separately.

SUMMARY OF THE INVENTION

The present invention has been made in view of the above-described problems, and aims to provide the following arrangement, wherein, in the printing surroundings such as a dispersion printing, a proxy printing and the like targeting at a plurality of printers, a setting set-up having high serviceability for the user can be performed.

In the arrangement which controls a group printer driver composed of a plurality of member printer drivers, a control is realized, wherein information on resolution held by each of a plurality of member printer drivers is realized, and from the information obtained on the resolution, the printing resolution of the group printer driver is decided, and the decided printing resolution is reflected on an user interface of the group printer driver.

Or in the arrangement which controls the group printer driver for supporting a plurality of output methods composed of a plurality of member printer drivers, a display control is realized, wherein, accompanied with the change in the output methods, a combination of the member printers corresponding to the changed output methods is recognized, and the printing set-up item contents corresponding to the recognized combination of the member printer drivers are reflected on the user interface of the group printer driver.

BRIEF DESCRIPTION OF THE DRAWINGS

FIG. 12 is one example of a table to decide a method of printable area decision corresponding to an output method in the present embodiments;

FIG. 21 is one example of the table to decide a method of the setting feasible area decision corresponding to the output method in the present embodiments;

FIG. 23 is one example showing the UI display of the group printer driver in the present embodiments; and FIG. 24 is one example of the flowchart showing the control of the decision of the setting feasible area corresponding to the change in the output method in the present embodiments.

DETAILED DESCRIPTION OF THE PREFERRED EMBODIMENTS

First Embodiment

Hereinafter, preferable embodiments adaptable to the present invention will be described.

Figure 1:
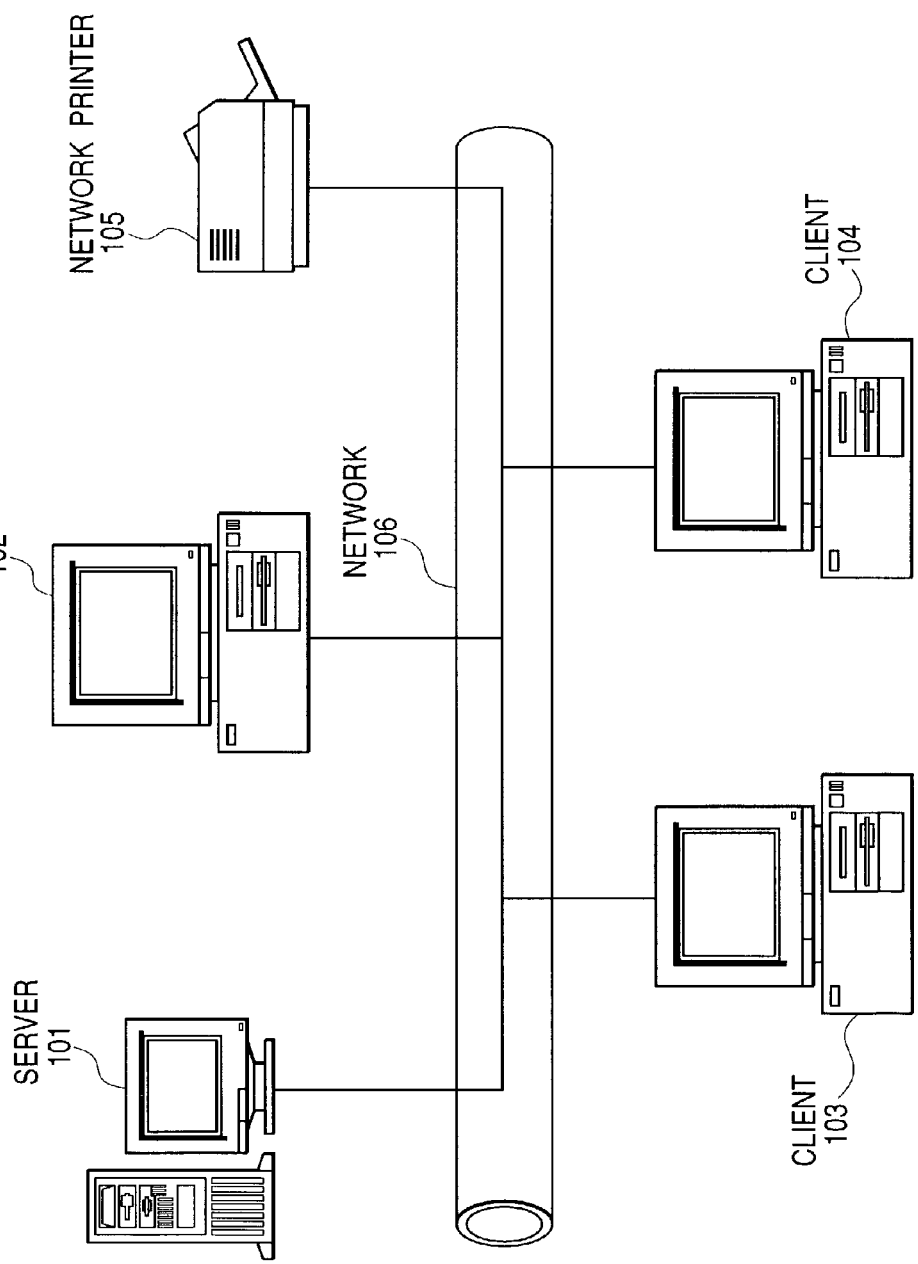
FIG. 1 is a block diagram explaining a constitution of a data processing system adaptable to the present invention.

FIG. 1 is a block diagram explaining a constitution of a data processing system adaptable to the present invention. Note that a client computer in the present system is assumed to be connected to one set or a plurality of sets.

In FIG. 1, reference numerals 102, 103, 104 denote the data processors as client computers (clients), and are connected to a network 106 by a network cable such as Ethernet (Registered Trademark), and can execute various types of programs such as application programs and the like, and are mounted with printer drivers having a function to convert printing data into a printer language corresponding to the printer. Note that the printer driver shall support a plurality of printer drivers.

Reference numeral 101 denotes a data processor as a server (hereinafter, referred to as print server) of the present embodiment, and is connected to a network 106 by a network cable, and accumulates files to be used in the network and monitors a using state of the network 106. The print server 101 controls a plurality of printers connected to the network 106.

As a constitution, the clients 102 to 104 and the print server 101 are general data processors, and printing control programs which perform different controls are stored in the client and the print server, respectively.

Further, the print server 101 is a general data processor, and can also have functions of clients 102 to 104 at the same time.

The print server 101 in the present embodiment has functions such as storing a printing job including a printing data, for which a request for printing has been issued from the client computers 102, 103, 104, or receiving only job information without including the printing data from the client computers 102, 103, 104, and controlling a printing sequence of the client computers 102, 103, 104, and notifying the client computers 102, 103, 104 put into a printing order of a transmission approval of the printing job including the printing data, and obtaining various information on a state of the network printer 105 and the printing job, and notifying the client computers 102, 103, 104 of the information.

Reference numeral 105 denotes a network printer which is a printing controller, and is connected to the network 106 via a network interface (not shown), and analyzes the printing job including the printing data transmitted from the client computer, converts them into dot images page by page and prints them page by page. Reference numeral 106 denotes a network, which is connected to the client computers 102, 103, 104, the server 101, a network printer 105 and the like.

Figure 2:
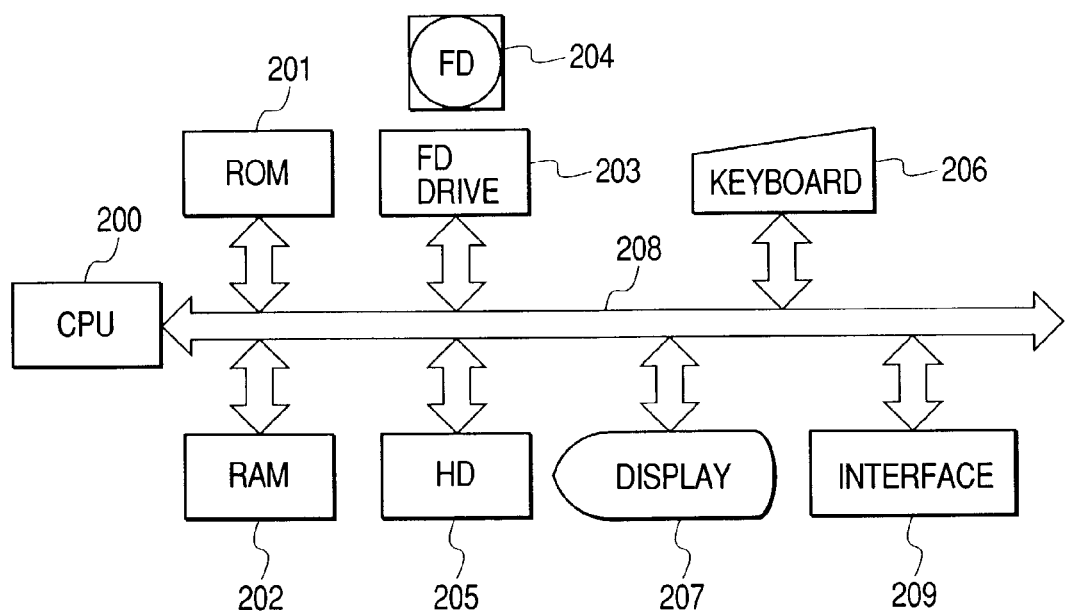
FIG. 2 is a block diagram explaining the data processor in the present embodiments.

FIG. 2 is a block diagram explaining a constitution of the data processor of the present invention, wherein the client computers 102, 103, 104 which are the data processors are constituted similarly, and further, the server 101 also comprises similar equivalent hard wares. Hence, the drawing will be described as a block diagram explaining the constitution of the client and the server.

In FIG. 2, reference numeral 200 denotes a CPU which is control means of the data processor, and executes an application program stored in a hard disc (HD) 205, a printer driver program, OS and a network printer control program of the present invention and the like, and performs a control to temporarily store the information required to execute the program, files and the like in a RAM202. Reference numeral 201 is a ROM which is storage means, and in its interior is stored various data including a program such as a basic I/O program and the like, a font data to be used at the time of document processing, template data and the like. Reference numeral 202 denotes a RAM which is temporary storage means, and functions as a main memory of the CPU200, a work area and the like.

Figure 5:
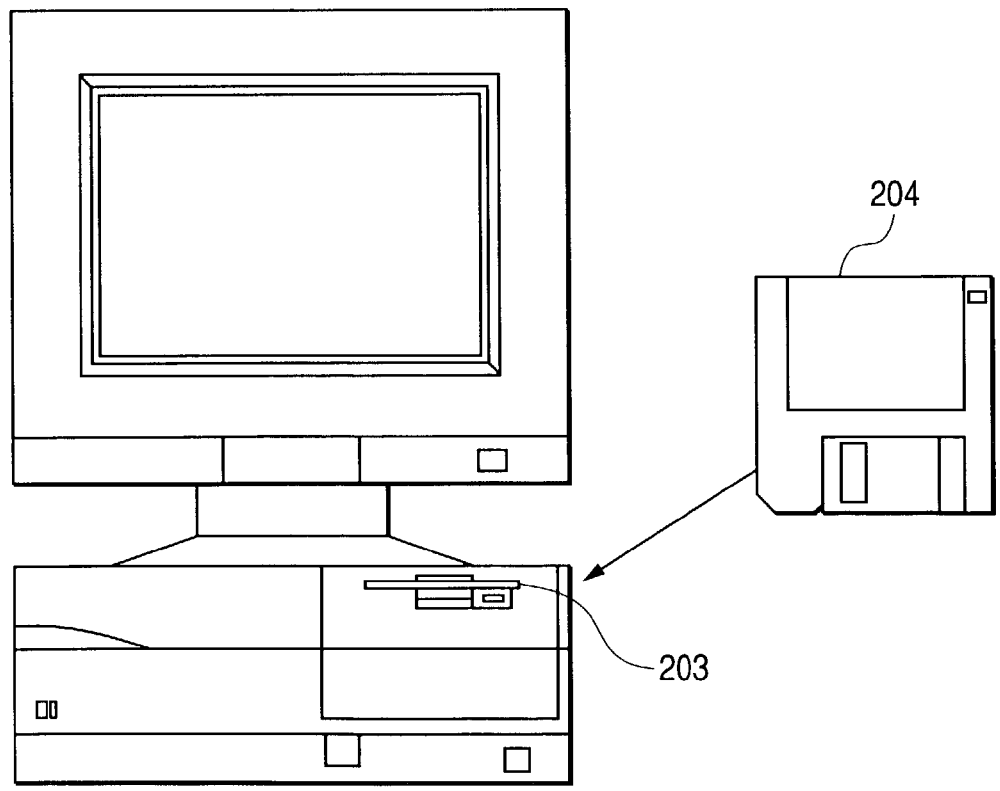
FIG. 5 is a view showing a relationship with a FD 204 to be inserted into a FD drive 203 shown in FIG. 2.

Reference numeral 203 denotes a floppy (Registered Trademark) disc (FD) drive as recording medium reading means, and, as shown in FIG. 5 to be described later, can load the program and the like stored in the FD204 as recording medium through the FD drive 203 into the present computer system. Note that the recording medium is not limited to the FD, but CD-ROM, CD-R, CD-RW, PC card, DVD, IC memory card, MO, Memory Stick and the like may be randomly used.

Reference numeral 204 denotes a floppy disk (FD) which is a recording medium, and is the recording medium storing a program readable by the computer.

Reference numeral 205 denotes one of external storage means, which is a hard disc (HD) functioning as a large capacity memory and stores the application program, the printer driver program, OS, the network printer control program, a relative program and the like. Further, a spooler which is spooling means is secured here. The spooling means is a client spooler in the case of the client, and is a server spooler in the case of the print server. Further, the print server stores job information received from the client, and a table which performs a sequential control is formed and stored by this external storage means.

Reference numeral 206 denotes a keyboard, which is instruction inputting means, and the user inputs and instructs a command of a control command of a device for the client computer, or an operator and a manager for the print server.

Reference numeral 207 denotes a display which is display means, and displays a command inputted from the keyboard 206 and a printer condition and the like.

Reference numeral 208 is a system bus, and presides over a flow of the data inside the computers, which are the clients and the print servers.

Reference numeral 209 denotes an interface which is input means, and the data processor performs exchange of the data with an external device via the interface 209.

Figure 3:
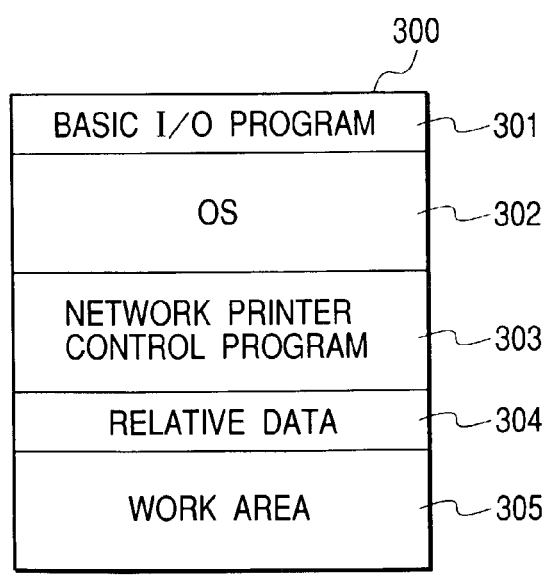
FIG. 3 is one example of a memory map of a RAM 202 shown in FIG. 2.

FIG. 3 is a view showing one example of a memory map of the RAM202 shown in FIG. 2, and is a memory map in a state where the network printer control program to be loaded from the FD204 is loaded on the RAM202 so as to be executable. Although the present embodiment shows an example where the network printer control program and relative data are directly loaded on the RAM202 from the FD204 and are executed, every time the network printer control program is operated from the FD204, other than those programs may be loaded on the RAM202 from the HD205 where the network printer control program has been installed last time. Further, the medium that stores the present network printer control program may be CD-ROM, CD-R, PC card, DVD, IC memory card other than the FD. Further, it is also possible that the present network printer control program is stored in the ROM201, so that the program is constituted so as to be a part of the memory map and executed directly by the CPU200. Further, with software which realizes a function equivalent to the above-described each device, an alternative as the hardware device can be constituted.

Further, the present network printer control program is sometimes simply referred to as a printing control program. The printing control program includes in the client a program to instruct a change in a printing destination of the printing job and perform a control to instruct a change in a printing order, and, further, includes in the print server a program to performs a sequential control of the printing job and notifies a termination of the printing job and a request for change in the printing destination. Further, the printing control program of the present invention performing such controls may be divided into a module to be installed in the client and a module to be installed in the print server separately, and one printing control program may be allowed to function for use of the client or for use of the print server depending on the surroundings in which the program is used. Or it is also possible that one set of the computer is installed together with the module having a function for use of the client and the module having a function for use of the print server and is allowed to perform a pseudo parallel movement simultaneously or in time division.

Reference numeral 301 is a basic I/O program, which is an area in which a program is available, where, when a power supply of the present controller is turned ON, OS is read from the HD205 into the RAM202 and a program having IPL (initial program loading) function is put in. Reference numeral 302 denotes an operating system (OS), and reference numeral 303 denotes a network printer control program, which is stored in an area to be secured on the RAM202. Reference numeral 304 denotes a relative data, which is stored in an area to be secured on the RAM202. Reference numeral 305 is a work area, where the area in which the CPU202 executes the present printer control program is secured.

Figure 4:
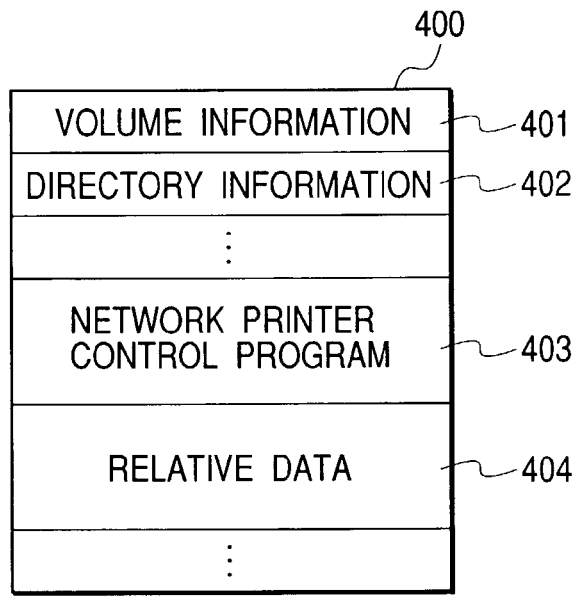
FIG. 4 is one example of a memory map of a FD 204 shown in FIG. 2.

FIG. 4 is a view showing one example of a memory map of the FD204 shown in FIG. 2.

In FIG. 4, reference numeral 400 denotes a data content of the FD204, reference numeral 401 volume information which shows the information of the data, reference numeral 402 directory information, reference numeral 403 a network printer control program which is a printing control program to be described in the present embodiment, and reference numeral 404 a relative data. The network printer control program of reference numeral 403 is programmed based on a flowchart to be described in the present embodiment, and in the present embodiment, both the client and the server have the same constitution.

FIG. 5 is a view showing a relationship between the FD drive 203 shown in FIG. 2 and a FD204 which is inserted into the FD drive 203, and the same components as those of FIG. 2 are given the same reference symbols.

In FIG. 5, the network printer control program and the relative data to be described in the present embodiment are stored in the FD204.

Next, a printing job control system, which uses a plurality of printers and performs the above-described printing processes such as dispersion, broadcast and proxy, will be described.

Note that, in the present embodiment, the printer, which virtually brings together a plurality of printers as one set of the printer, is referred to as a group printer. Printers that are brought together are referred to as member printers. Further, the printer driver corresponding to the group printer is referred to as a group printer driver and a member printer driver, respectively.

Figure 6:
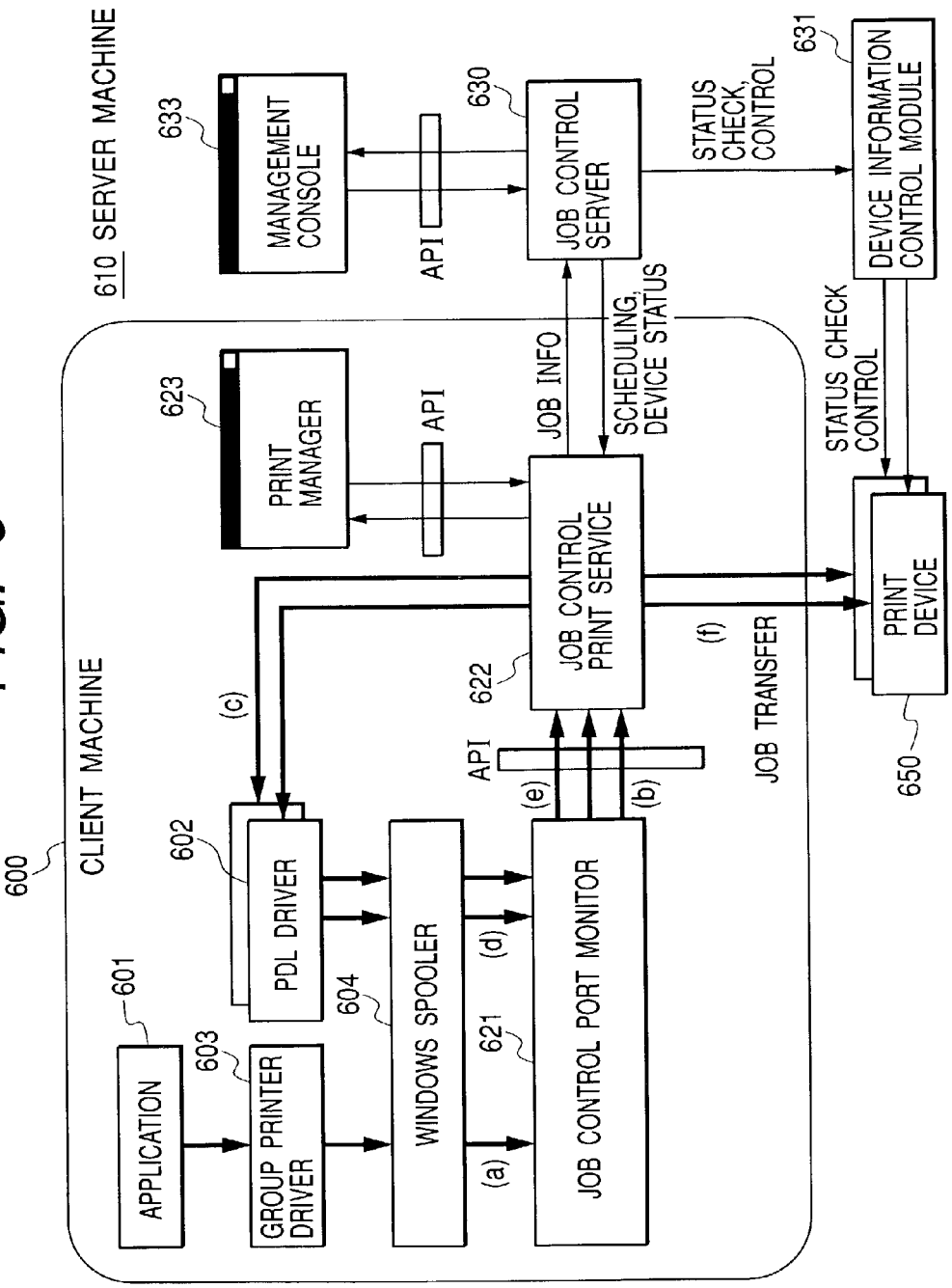
FIG. 6 is a block diagram explaining a printing control module constitution of the data processor of the present embodiments.

FIG. 6 is a view showing how the printing job, which is issued from a general application such as Microsoft Word, is processed in the printing job control system in a client-server model of the system. In FIG. 6, reference numeral 600 denotes the client and indicates a machine in which the client module of the printing job control system operates.

Usually, when the printing instruction is issued, the application program forms a series of draw commands, which are delivered to a Window Spooler via the printer driver. The Window Spooler delivers the printing job data to a port monitor selected by the user and takes a procedure to allow the data to be transmitted to a printer device.

In the present embodiment, the user specifies in advance a port monitor 621 for the job control system (hereinafter, abbreviated as a job control port monitor in the present embodiment) and instructs a printing. The application program 601 forms a series of draw commands. The group printer driver 603, which receives the draw commands, forms a general-purpose printing file, and transmits it not to the port monitor which transmits a printing job data to the printer device, but to the job control port monitor 621 as the printing job data. The job control port monitor 621 transmits the printing job data not to a printer 650, but to a printing service 622 for the printing job control system (hereinafter, abbreviated as a job control printing service in the present embodiment). The job control printing service 622 performs a printing job control processing to be described later for the printing job data.

A printing manager 623 for the printing job control system (herein after, abbreviated as a job control print manger in the present embodiment) is a program to provide an user interface (hereinafter, referred to as UI), by which the user checks in what state the printing job is in the interior of the job control printing service 622 or operates the printing job.

The Job control printing manager 623 exchanges information and instruction with the job control printing service 622 via the interface (API) of the software of the job control printing service 622.

A server 630 for the printing job control system (hereinafter, abbreviated as a job control server in the present embodiment) makes centralized control(scheduling) of a timing for the job control printing service 622 on individual clients 600 to transmit the printing job data to the printer 650.

A manager control console 633 for the printing job control system (hereinafter, abbreviated as a job control management console in the present embodiment) exchanges information and instruction with the job control server 630 via the API, to which the software carried by the job control server 630 accesses, so that the entire printing job control system can be monitored. Further, the job control server 630 performs communications with each printer 650 by using a device information control module 631 so that the information regarding the printing job and operating state inside the each printer is obtained or the operation thereof is performed. The obtained information can be delivered to the job control printing service 622 of the client 600 side.

Next, the printing from the group printer driver 603 in the present embodiment will be described. The group printer driver 603 converts a series of draw commands formed by the application program into a general-purpose printing file, which is a file of an intermediate form, which does not depend on the types of the printer devices. A constitution of this general-purpose printing file will be described below.

This general-purpose printing file, as described above, is led to the job control printing service 622 (b) via the job control port monitor 621 (a) from the Windows Spooler 604. The job control printing service 622 forms a draw command (c) based on the general-purpose printing file corresponding to the type of the job control performed for the printing job, and subsequently, a PDL driver 602 makes the draw command into a PDL file which is interpretable for the printer 650. In FIG. 6 is shown an example where a job control to divide the printing job into two is performed for this printing job, and an example where two member jobs are formed is shown by an arrow mark (c). A PDL file formed by the PDL driver 602 is delivered again to the job control printing service 622 (e) via the Windows Spooler 604 and the job control port monitor 621 (d). The job control printing service 622 transmits a printing job data of PDL to the printer 650 (f) according to the instruction of the job control server 630.

The job control printing service 622 logically divides one general-purpose printing file into a plurality of printing jobs according to the printing instruction inside the general-purpose printing file and transmits them to separate printer devices, respectively or retransmits the printing job data once transmitted to separate printer devices. The (c), (d), (e), (f) in the drawing show a flow channel of the printing job data in such a case.

On the other hand, in the case where the general-purpose printing file is prepared by the application software and the application software directly throws in the general-purpose printing file as the printing job, a manner in which the information is delivered to the group printer driver 603 or the process content in the group printer driver 603 is different from the general application. As described above, in the case of the general application, when the application delivers the draw information to the group printer driver 603, the application calls for a GDI function of the Windows similarly as the usual printer driver, and according to which the group printer driver 603 forms the general-purpose printing file. In contrast to this, in the case of the application which directly prepares a general-purpose printing file, the application has already the general-purpose printing file and supplies it to the group printer driver 603. The group printer driver 603 rewrites the printing instruction in the interior of the general-purpose printing file based on the printing method set in advance as occasion demands and transmits it to the Windows Spooler 604.

Figure 8:
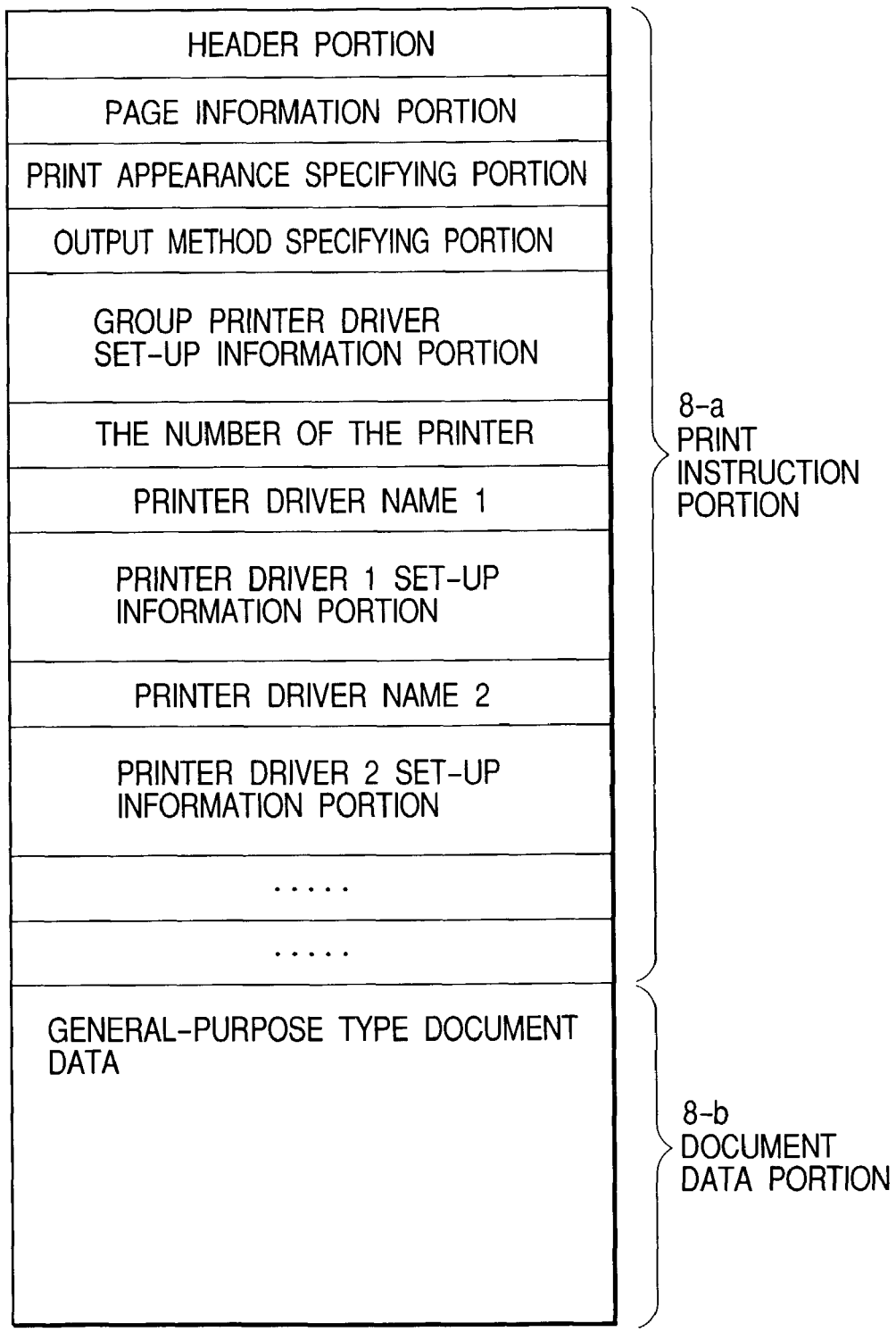
FIG. 8 is a view showing one example of a constitution of a multi-purpose printing file of the present embodiments.

FIG. 8 is a view showing one example of the constitution of the general-purpose printing file. The general-purpose printing file used in the present embodiment comprises a printing instruction portion 8-a and a document data portion 8-b. The printing instruction portion is a portion where the information on the document and the printing instruction are described. Further, the document data is a data where the data of the document of the application is converted into a general-purpose type data to become a data format not depending on a printer language. The printing instruction portion is constituted of a header portion, a page information portion, a printing appearance instruction portion, an output method specifying portion, a group printer driver set-up information portion, the number of the printer portions, names of the member printer drivers (identification information to identify the member printer drivers), a member printer driver set-up information portion and the like.

The header portion is a portion where the information such as version identification information of the present file and the file information are stored. The page information portion is a portion where the number of pages of the document data of the document data portion 8-b and the information such as a size of each page are stored. The printing appearance instruction portion is a portion where the information regarding output appearance such as a printing page range, the number of the printing copies, full-surface information of the document data (N-UP and bookbinding printing), a stapling instruction and a punching instruction and the like are stored.

The output method instruction portion is a portion where the information such as the dispersion printing, the color/monochrome dispersion printing, the proxy printing, the broadcast printing is stored as the output method. A group printer driver setting information part is a portion for storing setting information of UI of the group printer driver described below.

The number of the member printers is a part where the number of the member printers associated with the group printer drivers is stored. The member printer driver name is a portion where the name (ID) of the printer driver of the member printer is stored.

The member printer driver set-up information portion is a portion where the printer driver set-up item information of the Windows System, which is, for example, called as DEVMODE, is stored as the set-up information of the driver UI of the member printer. This member printer driver name and the member printer driver set-up information portion have the number of storing areas corresponding to the number stored in the number of the member printers.

When the general-purpose printing file is formed, the group printer driver 603 as described in FIG. 6 registers a set-up on the group printer driver GUI in the printing instruction portion 8-a. Further, the group printer driver 603 converts the data received by the GDI into a general-purpose data, and registers it in the document data portion of the present general-purpose printing file as a document data.

Note that it does not matter if the present file is a file where the printing instruction portion 8-a and the document data portion 8-b are different. In that case, the printing instruction portion exists as a printing instruction file, and the document data portion as a document data file respectively, and it is possible to bring together these files as one archive form and handle it similarly as one file.

Next, in FIG. 7, a relationship between a Print System provided by Windows and the printing job in the printing job control system and a process outline will be described further in detail.

Figure 7:
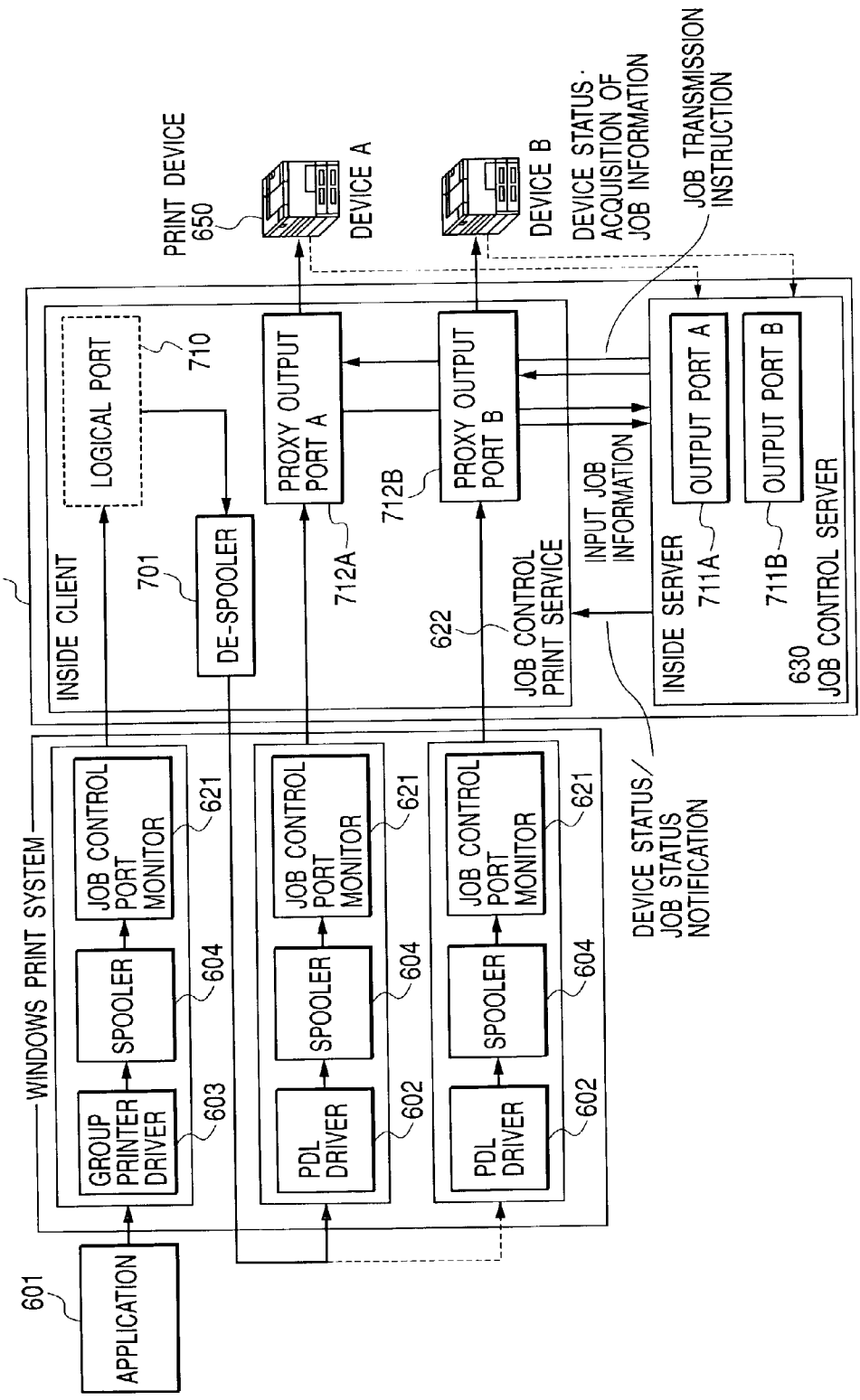
FIG. 7 is a block diagram explaining the printing control module constitution of the data processor of the present embodiments.

In FIG. 7, a printing job control system 700 shows a range of the printing job control system, which crosses over a physical machine where the server and the control program of the client operate. Further, an output port (Output Port) 711 controlled by the server is associated with an proxy output port (Proxy Output Port) 712 the job control printing service 622 of the client, and controls in a unified way all of the proxy output ports on each client associated with one port. In the present embodiment, actual printing job data is held in a proxy output port 712 of each client. The job control server 630 does not perform a transmission process of the printing job data itself, and performs transmission instruction only of the printing job for the job control printing service 622. According to that instruction, the job control printing service 622 of the client transmits the printing job data to the printer 650.

Next, a process in the case where the printing job control system 700 performs a value-added printing such as the proxy printing, the dispersion printing, the broadcast printing and the like will be described. In the case where the printing job control system 700 performs the value-added printing such as the proxy printing, the dispersion printing, the broadcast printing and the like, as described above, the user or the application 601 has to issue the printing job to the printer to which the group printer driver 603 is allotted. The job control printing service 622 receives the job data processed by the group printer driver 603 as the general-purpose printing file via the job control port monitor 621. The job control printing service 622 receives this job, and issues a job (a member job) to another printer, to which a PDL driver is allotted, via a Despooler 701, and allows the printer to print. At this time, the Despooler 701 interprets the printing instruction portion 8-a of the general-purpose printing file described in the FIG. 8, and processes a document data of the document data portion 8-b so as to be converted into the GDI of the Window, and transmits the printing instruction to each printer driver and issues the printing job. For example, in the case where the instruction of 2-UP was recorded on the printing appearance specifying portion, the document data for two pages is given a reduced-layout on one sheet. Further, in the case of the dispersion printing or the broadcast printing, according to the set-up thereof, the job is issued to a plurality of member printers described in the printing instruction sheet 8-a. In the case of the proxy printing, when a condition for proxy is satisfied, according to a prior set-up in the case of automatic proxy, and according to the user operation in the case of manual proxy, the member job is issued.

Further, when the job is issued to each member printer, the De-spooler 701 is required to prepare DEVMODE of each member printer as the printing instruction corresponding to the member printer driver. However, this DEVMODE allows the content described in the printing instruction portion 8-a to be suitably reflected and formed on the DEVMODE of each member printer.

The job control printing service 622 of the client side receives the PDL data of respective member jobs, which were rendered by the PDL driver 602, via the job control port monitor 621, and the information regarding the received jobs is notified to the server side, while the job data is temporarily held by its own proxy output que (Proxy Output Port) 712. Thereafter, the job data is transmitted to the printer 650 after the job control printing service 622 has received transmission instruction from the job control server 630.

Next, the control of the group printer driver for the printing job control system in the embodiment of the present invention will be described.

Figure 9:
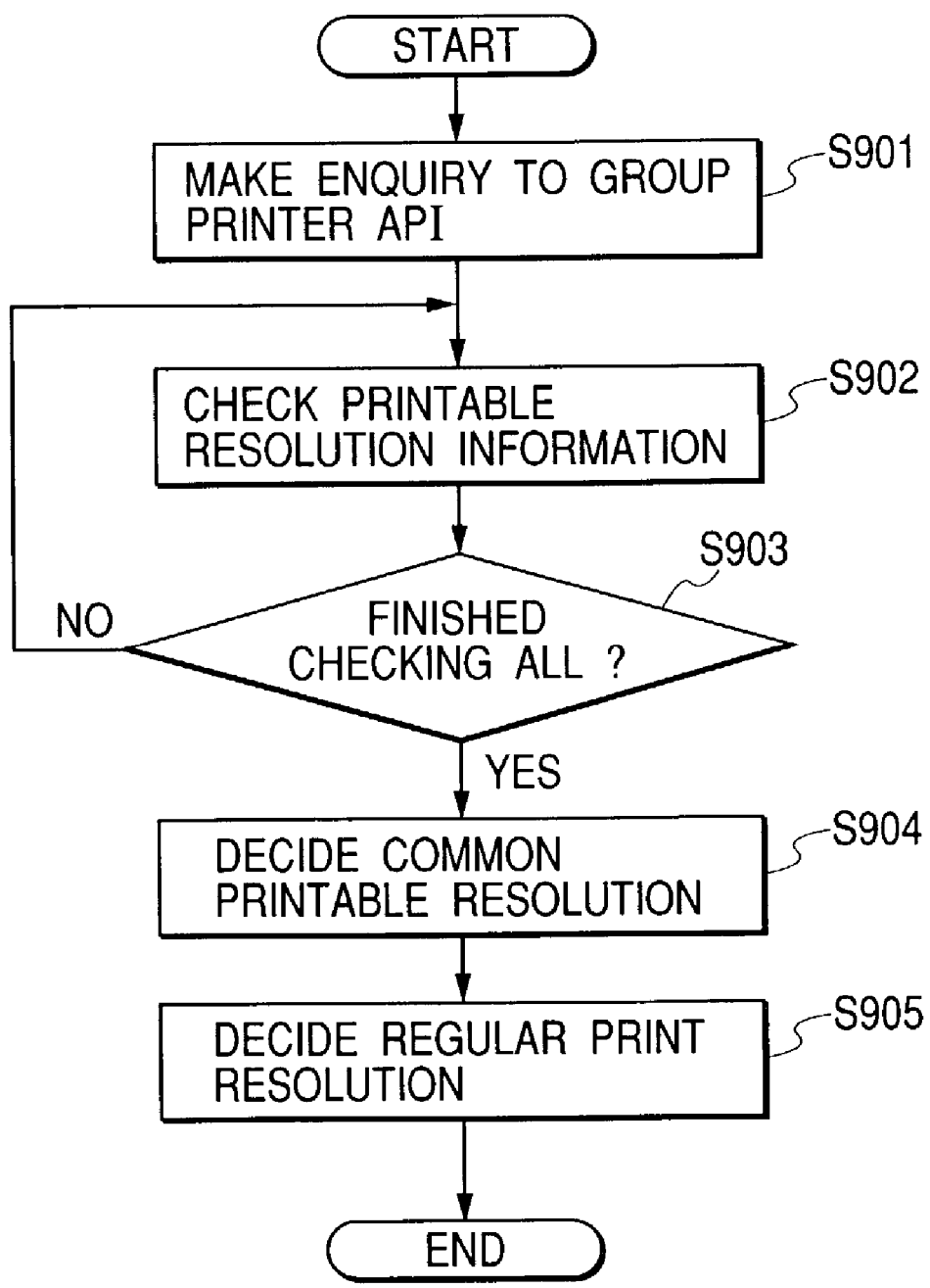
FIG. 9 is a flowchart showing a control on resolution of a group printer driver of the present embodiments.

FIG. 9 is a flowchart showing a process control flow at the installing time to the system of the group printer driver (there are some cases where a program having other function belonging to the group printer driver is included) of the present invention. The process of each step of the flowchart of this FIG. 9 shall be realized in accordance with execution of the process, wherein a CPU (Central Processing Unit) provided in the data processor described as above reads the control program stored in a predetermined recording medium such as ROM, FD, a hard disc (HD) and the like, and executes the process based on the read program.

First, in Step S901, when an installation starts via an pointing device of the user, the printing job control system API is called and the installation is executed, and each ID of the member printer drivers composing the group printer driver is obtained.

Here, the ID of the member printer driver will be described in detail. As the ID of the member printer driver in the present embodiment, for example, a name (text data) registered in an icon corresponding to the printer driver, identification information such as a serial number uniquely allotted to the printer driver, identification information uniquely allotted to a control table of the printer driver are assumed, but any information is applicable if it can specify each member printer driver. Further, the same thing can be assumed in FIGS. 10, 13, 16 to be described later.

Next, in step S902, based on the member printer ID obtained in step S901, the information on a printable resolution stored corresponding to each member printer driver is obtained.

In step S903, the determination is made as to whether or not the information on the printable resolution was obtained for all of the member printer driver IDs obtained in step S901, and in the case where the determination is made that the acquisition of the printable resolution is not terminated for all of the targeted member printer drivers, the process returns to the process of step S902, and the process thereof is repeated.

On the other hand, in step S903, in the case where the determination is made that the acquisition of the printable resolution was made for all of the targeted member printer drivers, the process moves to step S904.

From the data of the printable resolution of each member printer driver, which was obtained via step S901 to S903, a common printable resolution is decided. This common printable resolution is sometimes derived in plural types.

In step S905, regular printing resolution is decided from among the common printable resolutions obtained via step S904, and the decided regular printing resolution is held in a predetermined storage portion as the resolution of a rated value (default value) of the group printer driver and, after that, the process is terminated.

In this way, according to the flowchart described in FIG. 9, at a point of time when the group printer driver is installed, since a representative common printing resolution is decided from the printable resolutions of a plurality of member printer drivers and is held in a predetermined storage portion as a set value of the default of the group printer driver, an adequate printing resolution can be correctly replied to a subsequent enquiry from the application. Further, since an adequate common printable resolution is automatically decided by the process based on the flowchart of FIG. 9, there is no need for the user to deliberately check the resolutions of respective member printer drivers and perform complicated operations such as choosing adequate resolutions from the checked result.

Further, though, in the control of step S902 of FIG. 9, description was made such that the member printer driver should be enquired for the printable resolution via the Windows System, the member printer may be enquired directly from the process program (printing job system) of the present invention, or an embodiment may be assumed such that each member printer driver is corresponded in advance to the process program (printing job control system) of the present invention, and at the installing time of the group printer driver, the process program (printing job control system)of the present invention retrieves and checks the printable resolution corresponding to each member printer driver, which is registered in advance.

Figure 10:
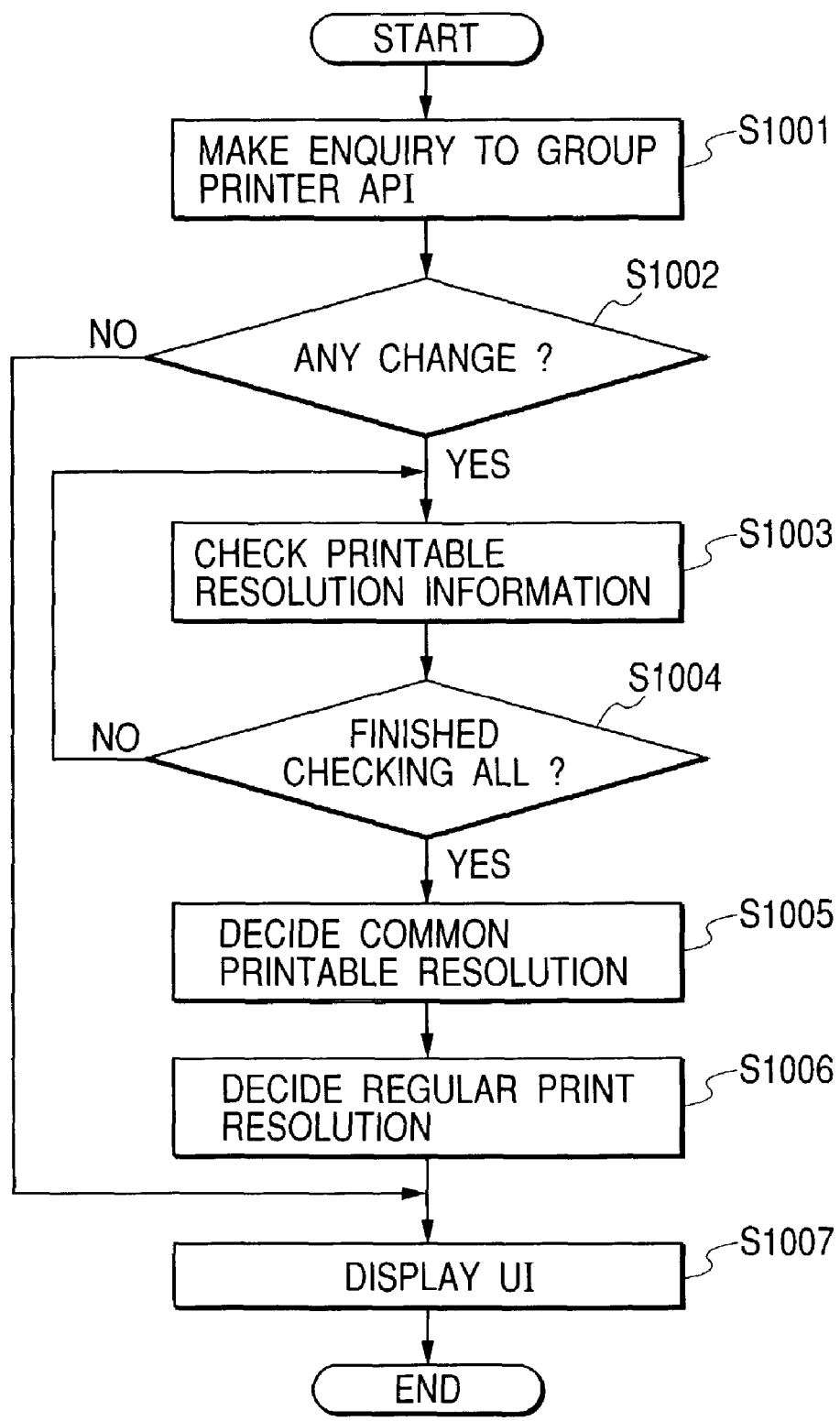
FIG. 10 is one example of the flowchart showing the control at the time of UI display processing of the group printer driver in the present embodiments.

FIG. 10 is a flowchart showing a process control flow at the UI display process time of the group printer driver in the present invention. The process of each step of the flowchart of the FIG. 10 shall be realized in accordance with execution of the process, wherein the CPU (Central Processing Unit) provided on the data processor as described above reads a control program stored in a predetermined recording medium such as ROM, FD, a hard disc (HD)and the like, and executes the process based on the read program.

In step S1001, when a request for the UI display is made from the application (application for Word Possessor and the like) via the Windows System, the printing control job system API is used, and as described in the above FIG. 9, the ID of each member printer constituting the group printer is obtained.

Next, in step S1002, the constitution of the member printer held in advance by the group printer driver, in other words, registered in advance for the group printer driver and the constitution of the member printer obtained in step S1001 are compared. Here, what is meant by the comparison here is the determination as to whether or not the combination of the member printer driver is the same.

As a result of the comparison process in step S1002, when the constitution of the member printer read in step S1001 and the constitution of the member printer driver registered in advance are determined to be not different, in step S1007, the value of the common printable resolution (which also includes the regular printing resolution decided from a single/a plurality of the common printable resolution) previously set before the last time is taken as the default value of the resolution of the UI, and is controlled so as to be reflected in the UI display.

Further, as a result of the comparison process in step S1002, when the constitution of the member printer driver is determined to be different, a process to obtain the printable resolution of each member printer is executed based on the ID of the member printer.

In step S1004, the determination is made as to whether or not the printable resolutions were obtained for all of the member printer driver IDs obtained in step S1001, and in the case where the determination is made that the acquisition of the printable resolutions is not terminated for all of the targeted member printer drivers, the process returns to step S1003 and the process thereof is repeated.

In step S1005, the common printable resolution is decided from each printable resolution of the ID of each member printer driver obtained via step S1001 to S1003.

Further, in step S1006, a predetermined resolution is decided as the regular printable resolution from among the common printable resolutions decided in step S1005, and after the decided resolution is held in a predetermined storage portion as the default value of the group printer driver, the display of the UI is controlled so that the resolution including at least the decided regular resolution is reflected.

Since the regular printing resolution is decided in this way to be set and held in the group printer driver, an adequately decided most suitable printable resolution can be precisely replied to the enquiry from the application thereafter.

Here, in step S904 of the flowchart of FIG. 9 or step S1005 of the flowchart of FIG. 10, the process to decide the common printable resolution will be described in detail.

In step S904 or step S1005, the printable resolution included in common in all of the member printer drivers are specified from the printable resolution corresponding to each obtained member printer driver. Further, in the case where the printable resolution included in common in each member printer driver is available in plurality, a plurality of common printable resolutions are selectively selected.

Further, when the regular printing resolution of step S905 or step S1006 is decided, in the case where a plurality of common printable resolutions are selected in step S904 or step S1005, the process to check the value of the resolution most close to the resolution (basic resolution) decided in advance in regular printing resolution deciding means is performed, and the value of the checked result is taken as the default value. The control is performed so that the selected regular printing resolution is controlled so as to be reflected and displayed in the UI.

On the other hand, in the case where there is no resolution available which is included in common in all of the member printer drivers, the process is performed, wherein the maximum value of the printable resolution is found for each member printer and a comparison between each member printer is made so that one of the maximum resolutions is adopted as the common printable resolution.

Figure 11:
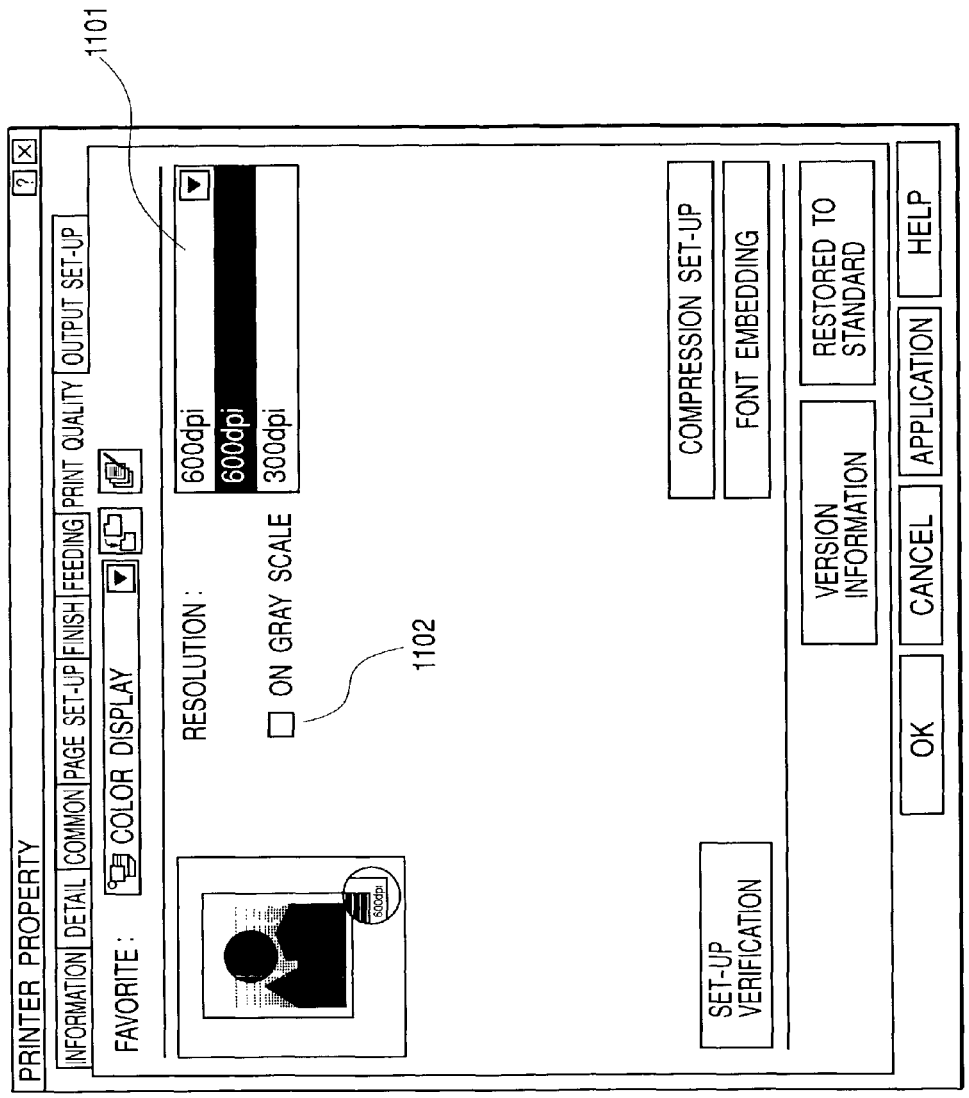
FIG. 11 is one example of a display state of the group printer driver UI in the present embodiments.

After the process was performed as described above in FIG. 9, FIG. 10, one example of the display state of the UI of the group printer driver displayed in the display portion of the data processor is shown in FIG. 11.

The display of FIG. 11 is equivalent to a display, wherein a display based on the image information to display the user interface included in the program for the printing control (which includes the group printer driver) of the present invention is displayed in the display portion via OS, and the display in the present embodiment was also displayed by the same arrangement.

In 1101 of FIG. 11, a state is reflected and shown in the UI as default, where the common printable resolution decided in step S904 or S1005 of FIG. 9 is a plurality of 300 dpi, 600 dpi, and further the regular printing resolution is defaulted at 600 dpi (corresponding to the case where a predetermined regulated basic resolution is 600 dpi) in step S905 or S1006.

In this way, according to the present invention, since the information on respective resolutions are obtained from the member printer drivers, in contrast to an embodiment where the resolution information is enquired and checked for the printer device connected via the data processor and the communication line, a load of the printer process can be reduced.

Further, though there is known a printing control method, wherein the printer server unitarily controls the resolution, printing speed and the like of the printers mutually connected on the network and meets the condition of the request for printing from the client, in the present invention, even in the surroundings where the printer server is not installed, if an embodiment is such that the member printer driver is stored in the data processor, it is possible to make a set-up consistent with the printing process of a plurality of printers with respect to the output method such as dispersion, broadcast, proxy printing and the like. Further, there is no need to enquire the printer server for the information such as the resolution and the like, and the amount of data traffic in the communication line can be reduced.

Second Embodiment

In a second embodiment, in step S904 of the flowchart of FIG. 9 or in step S1006 of the flowchart of FIG. 10, a process adopting a deciding method of an adequate common printable resolution according to the printing output method will be described.

In the present embodiment, a process of step S904 or step S1005 is executed according to a table of correspondence as shown in FIG. 12. That is, a processing method of step S904 or step S1005 is automatically switched according to the table of correspondence of FIG. 12 depending on which printing from among a value-added proxy printing, dispersion printing, broadcast printing and the like, a printing job control system 700 performs.

Here, according to the table of correspondence of FIG. 12, in the case where a printing control process according to a dispersion printing, a color/monochrome dispersion printing and a broadcast printing is executed by a group printer driver, a selection of a common resolution targeted at all of the member printer drivers constituting the group printer driver as described above is performed in step S904 or step S1005.

On the other hand, in the case where the printing control process according to the output method of the proxy printing by the group printer driver is executed, a control is executed, wherein a resolution of a representative member printer driver which is given a first priority in an order of proxy in step S904 or step S1005 is adopted by a proxy destination printer (printer driver). Among member printers registered in a printing job control system, the printable resolution of the member printer registered first in the order of priority is adopted as a common printable resolution.

Further as another embodiment, from among the common printable resolution found by common printable resolution deciding means (means which executes step S904 or step S1005), it is possible to adopt the maximum resolution or possible to adopt the minimum resolution.

Further, as another embodiment, with respect to the common printable resolution adopted in step S904 and step S1005, it is assumed in the present invention that, from the printable resolution of respective obtained member printers, all of the printing resolutions are adopted as the common printable resolution/the regular printing resolution.

Hereinafter, the printing control process utilizing FIG. 12 will be described in detail with reference to FIG. 13. The process of each step of the flowchart of FIG. 13 shall be realized in accordance with execution of the process, wherein the CPU (Central Processing Unit) provided on the processor which becomes a main body of the process described as above reads a control program stored in a predetermined recording medium such as ROM, FD, a hard disc (HD) and the like, and executes the process based on the read program.

First, in steps S1301 to S1303, the determination is made as to whether or not the output method currently set via a group printer driver 603 is a broadcast printing or a dispersion printing or a color/monochrome printing.

In whichever step, in the case where the determination result is No, the process moves to step S1304.

In step S1304, the determination (recognition) is made that the output method is the proxy printing.

Figure 13:
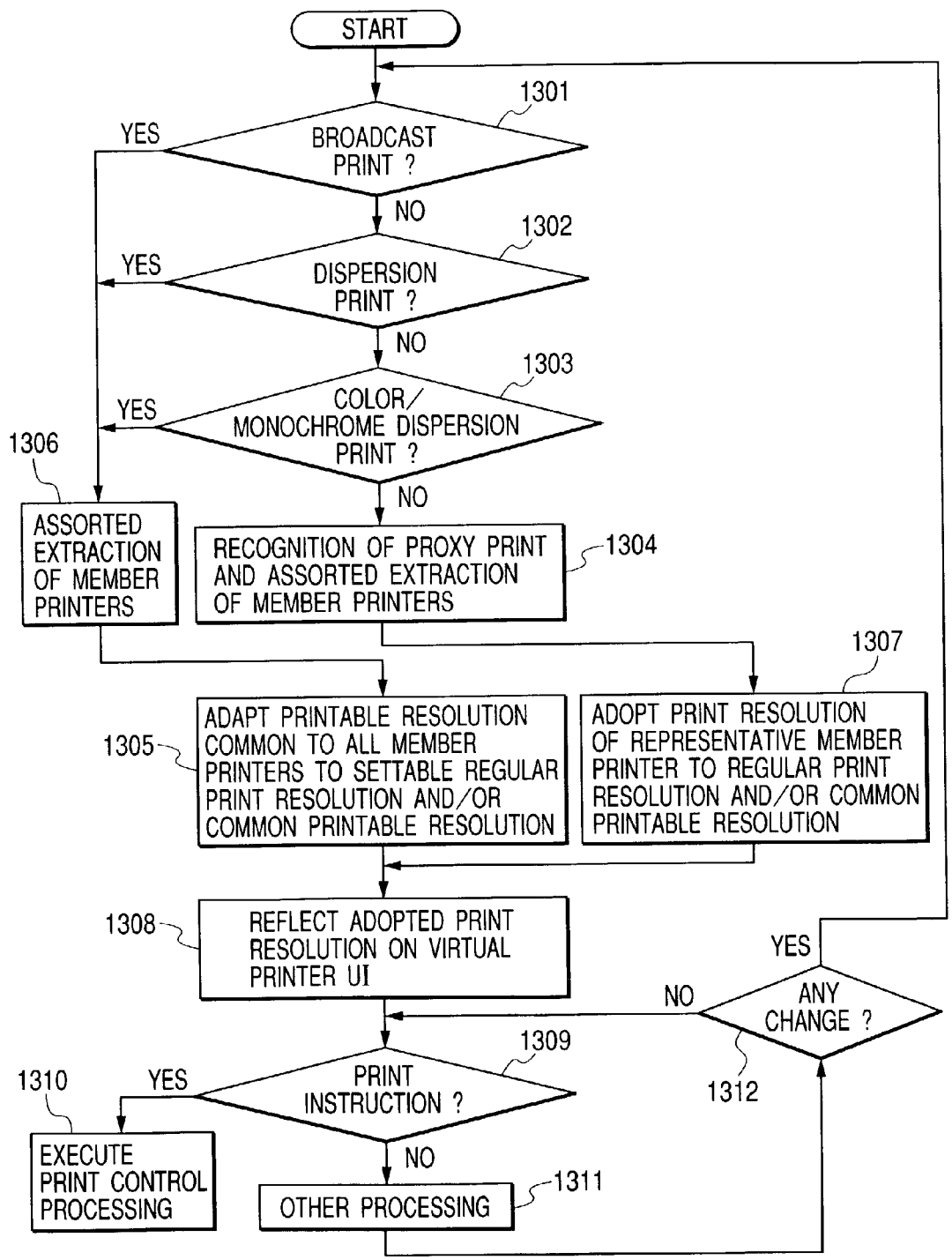
FIG. 13 is one example of the flowchart showing the control of the decision of a regular printing resolution and/or a common printable resolution according to a change in an output method in the present embodiments.

Of course, in the case where there are available more output methods, it is assumed that determination processes regarding various output methods and printable resolution deciding methods corresponding to respective output methods are applicable to the flow of FIG. 13.

Further, in the case where the determination is YES in any of the step S1301 to step S1303 regarding the output method set in the group printer driver, "the resolution common to all of the member printers" is adopted (S1305) as the method for deciding the optimum common printable resolution. This adoption is realized by referring to a table of correspondence with the output method such as the FIG. 12 and with a common printable resolution calculating method. Note that, though the table in FIG. 12 is assumed to be a table for finding the common printable resolution, the table can be taken as a table for deciding the regular printing resolution until the regular printing resolution is decided from among the resolutions adopted by using this table of FIG. 12. Further, in the case where the output method corresponds to the proxy printing, though the method which decides the common printable resolution is described as being "the same as the first member printer in the proxy order" in FIG. 12, this means that the same resolution as the first member printer in the proxy order is adopted for the member printer driver constituting other virtual proxy printers.

Here, the method of "common resolution to all of the member printers," as described in the first embodiment, is equivalent to a control method, where one or more printing resolutions obtained in common in all of the member printers are turned into set-up feasible common printable resolutions.

Further, in the case where the determination is No in any of the output method of the step S1301 to step S1303, that is, in the case where the determination is made that the output method set at present is "the proxy printing," a selectable printable resolution in the group printer driver is taken as the resolution of a representative member printer driver based on the table of FIG. 12 (S1304).

Here, the representative member printer (representative member printer driver) means a member printer driver which is a first in the order of priority from among any of a plurality of member printers set in the order of priority via the user interface as described in the first embodiment, and this is taken as the representative member printer. The aim thereof is to assume an embodiment wherein the proxy printing occurs on rare occasions and to draw out performance of the member printer at the maximum, which is the first in the order of priority. The order of priority is set at random according to the instruction of the user, but at this time, the resolution is set, which was set by allowing the printing resolutions of the member printer drivers which are the second, the third, the fourth, Nth . . . to correspond to the representative member printer driver.

In steps S1306, S1304, a combination of the member printer drivers corresponding to the output methods recognized accompanied with the change in the output methods in the steps S1301 to S1303, step S1304 are extracted. This can be made equivalent to the processes of steps S901 to S903 of FIG. 9 described as above.

Figure 14:
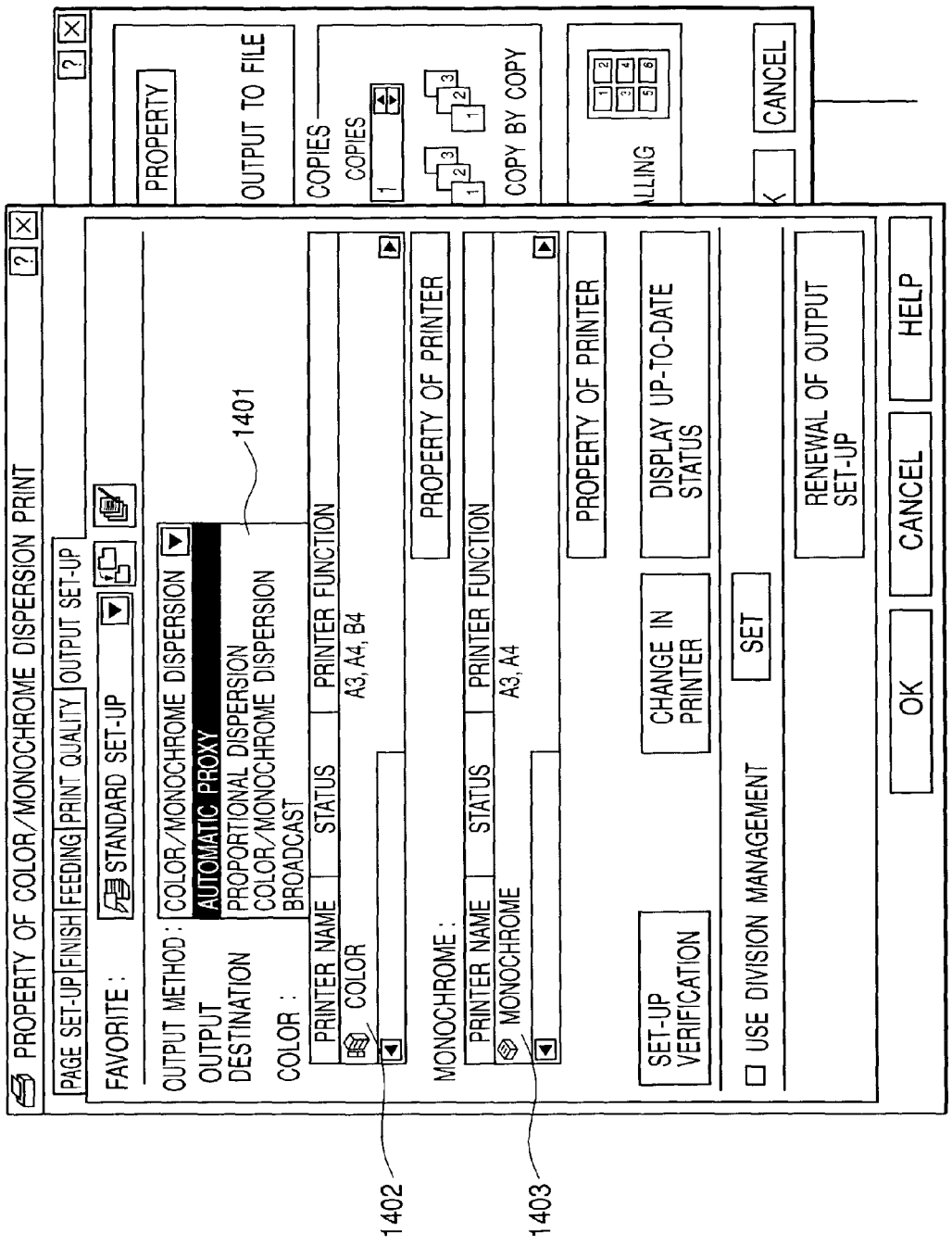
FIG. 14 is one example showing an UI display of the group printer driver in the present embodiments.

In the printing control program (FIG. 6, FIG. 7) in the present embodiment, the combination of the member printer drivers can be set independently for every output method (the dispersion printing/the color/monochrome dispersion printing/the broadcast printing/the proxy printing), respectively, and further the set-up can be held in holding portions in a reusable form. Although the reusable set-up held in those holding portions can be extracted by changing the output method via the UI of the group printer driver, a display state of the set-up screen is shown in FIG. 14.

In steps S1305, S1307, based on a combination (process results of steps S901 to S903) of the member printer drivers extracted and the table of FIG. 12, the set-up feasible common printable resolution (which includes the regular printing resolution) are decided by corresponding to the recognized output method. That is, based on the table of FIG. 12, a calculation method of the resolution corresponding to the output method is decided, and further a printing set-up content (printing resolution) to be reflected in the group printer driver UI by the calculation method based on FIG. 12 is found from among the combination of the member printer drivers corresponding to the change in the output methods.

Note that the table content shown in FIG. 12 is not limited to the content shown in FIG. 12, but for example, can be adequately changed to "the resolution common to all of the member printers" for "the proxy printing", "same as the member printer which is the first in the order of priority" for "the dispersion printing" and the like, and this is assumed as a modified embodiment.

In step S1308, the set-up feasible printing resolution decided in step S1305, step S1307, that is, a display control process of a group printer driver user interface based on the regular printing resolution and the common printable resolution is executed. For example, FIG. 11 and the like are equivalent to this.

In step S1309, the determination is made as to whether or not a printing instruction via a group printer driver 603 is issued, and when the determination is made that the instruction was issued, the printing control process of the arrangement described based on the FIGS. 6, 7, 8 is executed.

On the other hand, in the case where the determination is No in step S1309, other printing set-up and the like are executed in step S1311.

In step S1312, the determination is made as to whether or not a change instruction (change input) of the output method was issued via the group printer driver 603, and when the determination is made that the change was made, the process is allowed to move to S1301, and in steps S1301 to S1304, the determination is made as to which types of output methods the process was changed to, and the process subsequent to S1301 is repeatedly executed. This is considered that the combination of the member printer drivers was changed by corresponding to being determined Yes in step S1312, and can be corresponded to the process allowing the flowchart of FIG. 10 to be executed.

Here, the change instruction of the output method is performed via an instruction set-up screen as shown, for example, in 1401 of FIG. 14. It is possible to allot a combination of the member printer drivers independently and respectively to each output method, and the information on this combination is held in a predetermined storage portion. For example, a combination of the member printer drivers corresponding to the output method of the color/monochrome dispersion corresponds to 1402 and 1403. Further, in the case where the determination is Yes in step S1312, when the common printing resolution is changed accompanied with the change in the regular printing resolution and/or the common printable resolution, a warning is displayed in the display portion of the client to the effect that "would it be alright that the calculation method of the regular printing resolution and/or the common printable resolution be changed?" and the like.

Figure 15:
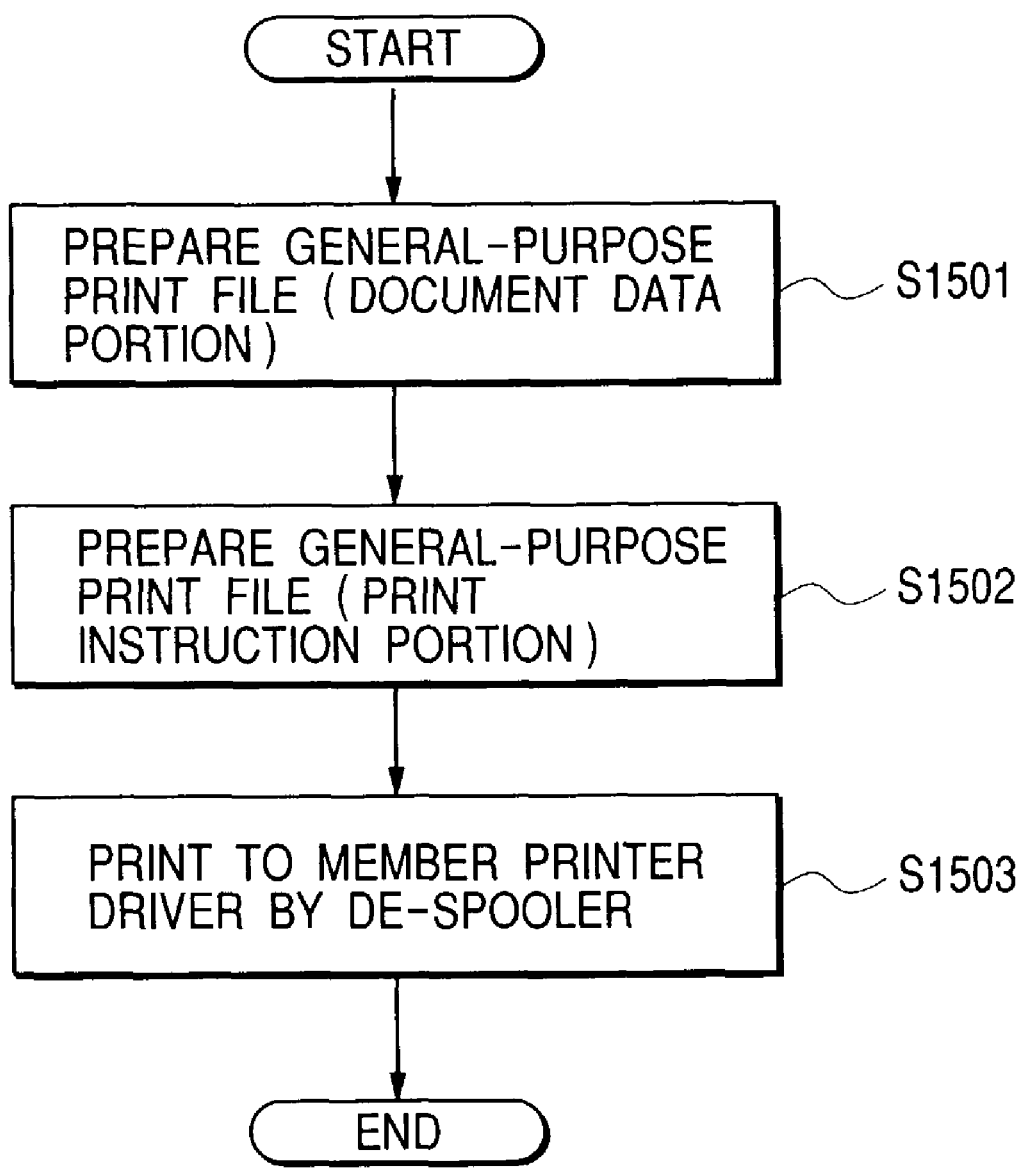
FIG. 15 is one example of the flowchart showing a flow of a printing process in the present embodiments.

Here, the printing process (the printing control process described last time by using FIG. 6, FIG. 7) according to the decided regular printing resolution and/or common printable resolution in the process of step S1310 will be described in detail by using FIG. 15. Note that the process of each step of the flowchart of FIG. 15 shall be realized in accordance with execution of the process, wherein the CPU (Central Processing Unit) provided on the data processor described as described above reads the control program stored in a predetermined recording medium such as ROM, FD, a hard disc (HD) and the like, and executes the process based on the read program.

First, in step S1501, based on the resolution set via the group printer driver UI, a document data portion of a general-purpose printing file is formed. Here, the printing resolution used for the formation of a document data portion 8-*b* is applied with the regular printing resolution decided by the user via the group printer driver UI or decided automatically by the group printer driver from a single or a plurality of the common printable resolutions decided based on the FIGS. 9, 10, 13 described last time and the flowchart of FIG. 16 to be described later.

Further, in addition to the resolution, the document data portion 8-*b* of the general-purpose printing file, which follows the arrangements of FIGS. 6, 7 corresponding to other set-up items of the group printer driver UI such as "printing in a gray scale", following the check in 1102 of FIG. 11, for example is formed. For example, in the case where the user sets up the "printing in a gray scale" via the group printer driver UI, the document data portion 8-*b* is formed as the document data to convert the color data into the gray scale.

Next, in step S1502, the resolution set via the group printer driver UI is used again so that the information on the resolution is described in the output method instruction portion of the printing instruction portion 8-*a* of the general-purpose printing file.

Further, in the printing instruction portion 8-*a* of the general-purpose printing file is formed a 2 in 1 function which prints two pages by reducing them to a size of one page portion as described in the first embodiment, and is also formed according to the other group printer driver UI set-up items.

Further, the general-purpose printing file may be prepared by the group printer driver 603 or by sharing the burden of the preparation by the group printer driver and a job control printing service 622. For example, an embodiment is assumed such that the data which becomes a basis of the document data portion 8-*b* is formed by the group printer driver 603, and based on the formed data and various pieces of printing set-up information set via the user interface (for example, FIG. 11) of the group printer driver 603, the job control printing service 622 forms the general-purpose printing file as shown in FIG. 8.

By using the general-purpose printing file prepared in this way, a printing data such as the page description language to be transmitted to the device (image forming apparatus such as the printer and the like) of the embodiment by each member printer is formed.

In step S1503, the printing instruction to each member printer driver by a De-spooler is performed. As described by using FIG. 7, the formed general-purpose printing file (FIG. 8) is interpreted by the De-spooler, and the printing instruction is performed by corresponding to the member printer driver registered in advance by corresponding to each output method. At this time, in step S1502, the printing resolution registered in the printing instruction portion 8-*a* of the general-purpose printing file is also specified to the member printer driver.

At this time, depending on the deciding method described above of the common printing resolution, it is not necessarily possible for the member printer driver to print by the printing resolution registered in the printing instruction portion, but the set-up thereof is attempted, as a result of which it is assumed that there are some cases where a standard resolution set-up of the member printer driver itself becomes effective.

In this way, when the printing is executed in step S1503 to be described later, since the printing adequate to the resolution of the document data portion 8-*b* of the general-purpose printing file prepared in step S1501 is executed by the member printer driver, deterioration of the print quality accompanied with magnification and reduction due to difference between the document data and an actual printer resolution is constrained, so that a printing result of high quality can be obtained.

In step S1503, the printing process based on the output method desired by the user is executed. At this time, according to the instruction by the printing instruction portion of the general-purpose printing file, the printing process is performed. At this time, the transmission of the data based on the page description language adequate to each corresponding device is performed, and in the device side, an image recording to the recording medium is performed based on the received printing data.

As described above, according to the flowchart of FIG. 13, corresponding to the change in the output methods (dispersion printing, color/monochrome dispersion printing, broadcast printing, proxy printing) via a virtual printer, which has not been envisioned in the past, the problem of an adequate printing set-up not possible to be performed has come to be solved. To describe one in detail, when the member printer driver is changed accompanied with the change in the output method, the drawing out of an adequate printing set-up content can be realized by a combination of the member printer drivers (performance of each member printer) after the change and a conflict method of the set-up items specified from the output method, and for example, it became possible that the common printing resolution and the regular printing resolution are adequately decided.

Note that, though the resolution as one item of the printing set-up has been described in FIG. 13 as an example, the present embodiment is not limited to this, but applied to various printing set-up items such as a margin (printable area) to be described later, a position instruction of a stapling and the like. At this time, the present embodiment is realized by executing as the printing set-up items, to which FIG. 9, FIG. 13 and FIG. 16 to be described later are applied, and in the device or the method performing the control via the group printer driver (virtual printer) which supports a plurality of output methods constructed by a plurality of member printer drivers, recognition mean (S1304, S1306) for recognizing a combination of the member printer drivers corresponding to the changed output methods and display control means (S1308) for finding a printing set-up item content (S1308) corresponding to a combination of the member printer drivers by recognition of the recognition means and allowing the content to be reflected in the user interface of the group printer driver are realized.

Further, since the arrangement for utilizing the table that decides the common printing set-up corresponding to the output methods such as FIG. 12 is realized, the arrangement for performing the printing set-up of more adequate virtual printer is realized.

Specifically, in the case of the printing set-up item for the margin, a table that replaces "resolution" in FIG. 12 with "margin" may be used, and FIG. 9, FIG. 13, FIG. 16 to be described later may be executed with respect to the margin. Further, with respect to the stapling and other printing set-up items, the same thing as the margin can be assumed.

Third Embodiment

In a third embodiment, as a deciding method of the optimum regular printing resolution and/or common printable resolution, an embodiment which adopts all of printable resolutions of each obtained member printer or an embodiment which adopts a printable resolution of a predetermined member printer specifiable by the user as a regular printing resolution or a common printable resolution will be described.

Hereinafter, the third embodiment will be described with reference to FIG. 16. Note that FIG. 16 is a flowchart showing a process control flow at the time when a group printer driver UI is displayed, and the process of each step of the flowchart shall be realized in accordance with execution of the process, wherein a CPU (Central Processing Unit) provided in a data processor which becomes a main body of the process reads a control program stored in a predetermined recording medium such as ROM, FD, a hard disc (HD) and the like, and executes the process based on the read program.

First, in step S1601, when a request for UI display is received from an application via the Windows System, by using a printing job control system API, an ID of each printer driver composing a group printer driver is obtained.

In step S1602, a comparison between a constitution of the member printer held in advance by the group printer driver and the member printer driver ID obtained in step S1601 is performed.

In the case where the determination is made that there is no change in step S1602, in step S1607, a display of an user interface for performing various set-up of the group printer driver in which the common printable resolution decided last time is allowed to be reflected is displayed.

Further, as a result of the comparison in step S1602, in the case where the determination is made that the constitution of the member printer driver is changed, the printable resolution peculiar to each member printer driver based on the ID of each member printer driver is obtained (S1603), and the process of step S1603 is repeatedly performed for all of the member printer drivers (S1604).

Figure 17:
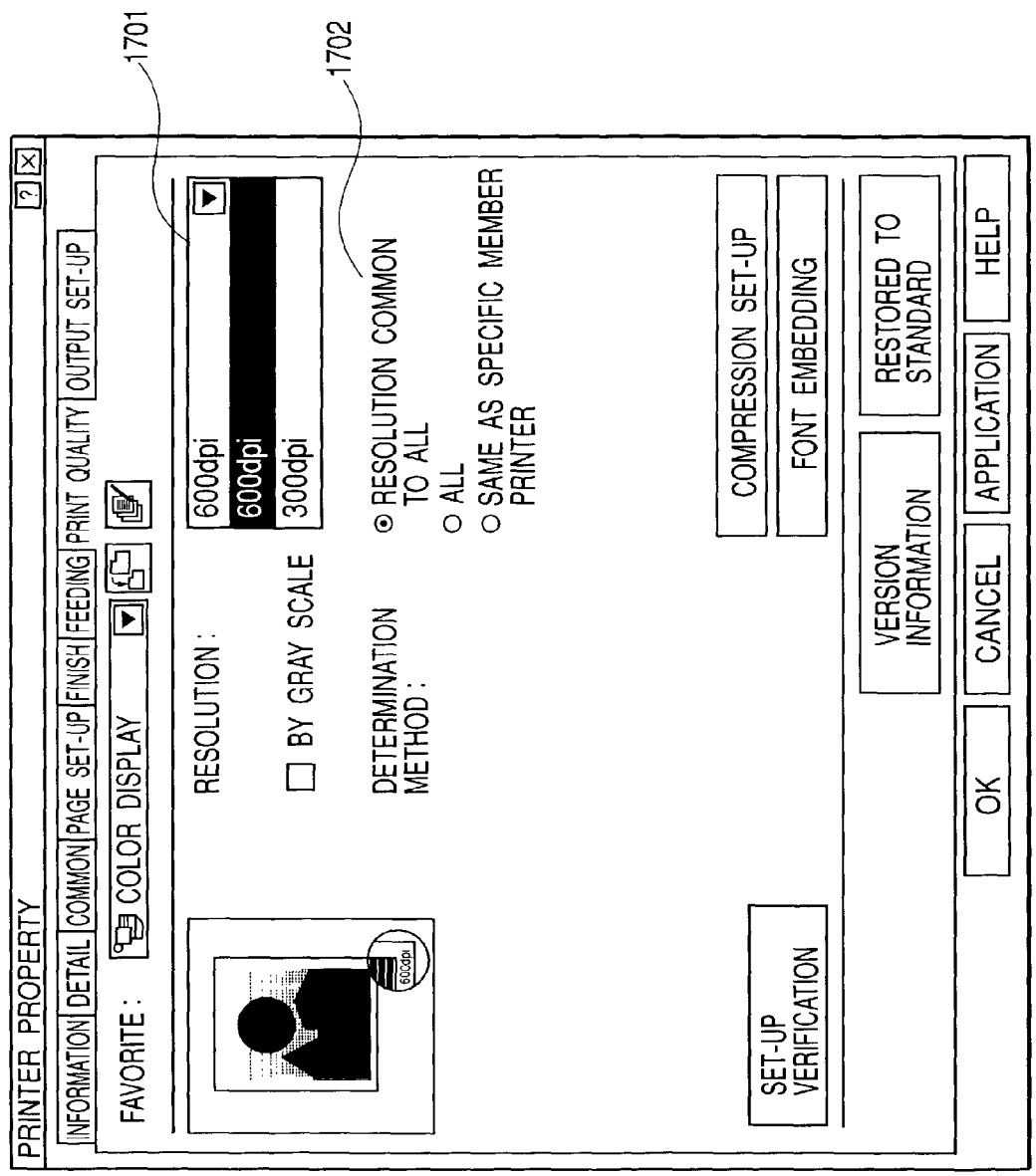
FIG. 17 is one example showing the UI display of the group printer driver in the present embodiments.

Based on the information regarding the printable resolution of each member printer driver obtained in step S1603 and step S1604 and a common printing resolution deciding method instructed last time or in advance via the user interface as shown in FIG. 17 (1701), the common printable resolution and a regular printing resolution are decided (S1605, S1606).

The control is performed such that the value of the printable resolution decided in steps S1605, S1606 is allowed to be reflected and displayed in the UI of the group printer driver (S1606).

Further, in step S1607, the determination is made as to whether or not the user is instructed to change the common printable resolution deciding method to a predetermined common printable resolution deciding method.

In the case where recognition is made that an instruction to change was inputted in step S1607, based on the common printable resolution decision which was instructed to be changed and the information on the printable resolution of each member printer driver obtained in the process of step S1603 and step S1604, a common printable resolution is decided again (S1605, S1606).

In step S1607, the control is performed such that the value of the printable resolution decided again in steps S1605, S1606 is allowed to be reflected and displayed in the UI of the group printer driver.

Further, in step S1608, in the case where the determination is made that there was no input instruction to change the deciding method via the group printer driver UI, the common printable resolution deciding method (regular printing resolution deciding method) currently selected and the printable resolution decided in steps S1605, S1606 are held in a predetermined storage portion as a set-up value of the group printer driver, and the process thereof is terminated.

On the other hand, in step S1608, in the case where the input instruction to change the deciding method was made via the group printer driver UI, based on the changed deciding method and performance information of each member printer driver obtained in advance in the process of the steps S1601 to S1604, the decision of new common printable resolution and regular printing resolution is executed, and in step S1607, a display control process in which a new UI is reflected is executed. Note that, in the case where the determination is Yes in step S1608, an embodiment is also assumed, wherein the process returns to step S1601.

Figure 16:
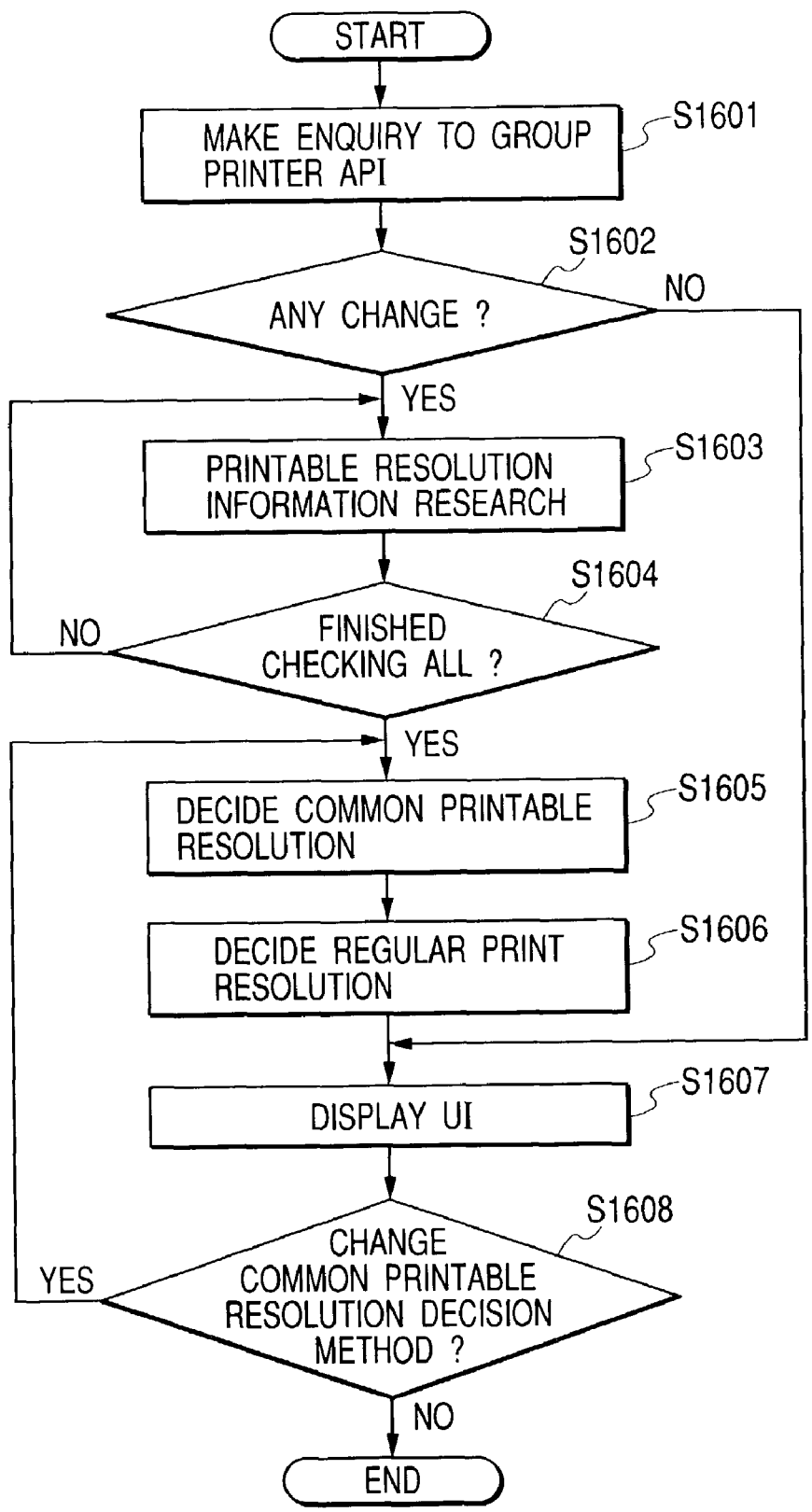
FIG. 16 is a flowchart showing the control on the resolution of the group printer driver in the present embodiments.

In this way, according to the flowchart of FIG. 16, the printable resolution is decided by the printable resolution decided method desired by the user, and the specification of the printing resolution can be easily made.

FIG. 17 shows an UI display example in this constitution. The user can select a desired printable resolution deciding method from 1702 via a pointing device such as a mouse and the like. Particularly, in the case where recognition is made that a check is inputted to "same as a specific member printer", a selection screen (not shown) including a printer list for further selecting a predetermined printer is displayed, and the printer selected from this list is allotted to the "specific printer".

Further, the common printable resolution decided for the change in the printable resolution deciding method at 1702 is reflected and displayed in 1701, and the regular printing resolution is reflected and displayed in 1701 as a default value.

Although, in the first to the third embodiments, the resolution has been described, the present patent invention is not limited to this, and for example, it is assumed that the invention is also adopted for a sheet size, a margin (setting feasible area) and the like.

In such a case, the arrangement such as FIG. 12 is set regarding the sheet size and the margin, and the flowcharts of FIGS. 9, 10, 13, 15 and 16 are executed regarding the sheets size and the margin, so that the user interface of the group printer driver such as FIG. 11 regarding the sheet size and the margin can be provided, and similarly as the resolution, an adequate printing set-up method can be provided according to the output method and a combination of the member printers.

As described above, it is possible to allow the printing to be performed at the maximum adequate set-up (resolution) in the printing process of a plurality of printers without anything to be set by the user.

Further, by adopting the optimum common printing set-up extraction method for every operating set-up of the printing job control system, the printing set-up (printable resolution) can be provided in accordance with the object of the printing job control, and the optimum printing resolution can be easily set.

Further, by having the user interface which can explicitly specify a predetermined printing set-up (printing resolution) as a default, a set-up method of more flexible printing set-up (printing resolution) can be provided for the user who is not satisfied with the printing set-up (printing resolution) automatically decided as a regular value.

In a practical set-up of the printing resolution, by displaying the printing resolution decided by the regular printing resolution deciding means as a regular value, an adequate printing resolution set-up can be provided for almost all of the users without giving the trouble of selecting the printing resolution again. Further, with respect to the resolution which is unprintable by any printer or which is deteriorated in print quality, by not allowing it to be displayed and selected in every way, deterioration of print quality can be prevented from occurring by mistake.

As described above, according to the first to third embodiments, it is possible to provide the arrangement of the printing set-up in the virtual printer, which is convenient for the user.

Fourth Embodiment

Next, in a fourth embodiment of the present invention, a still further control of a group printer driver for a printing job control system will be described with margin information as an example. Note that the control via the group printer driver in the fourth to the sixth embodiments to be described later shall be applied not only with the resolution described in the first to third embodiments, but also applied with various other printing set-up such as a stapling instruction and the like.

Figure 18:
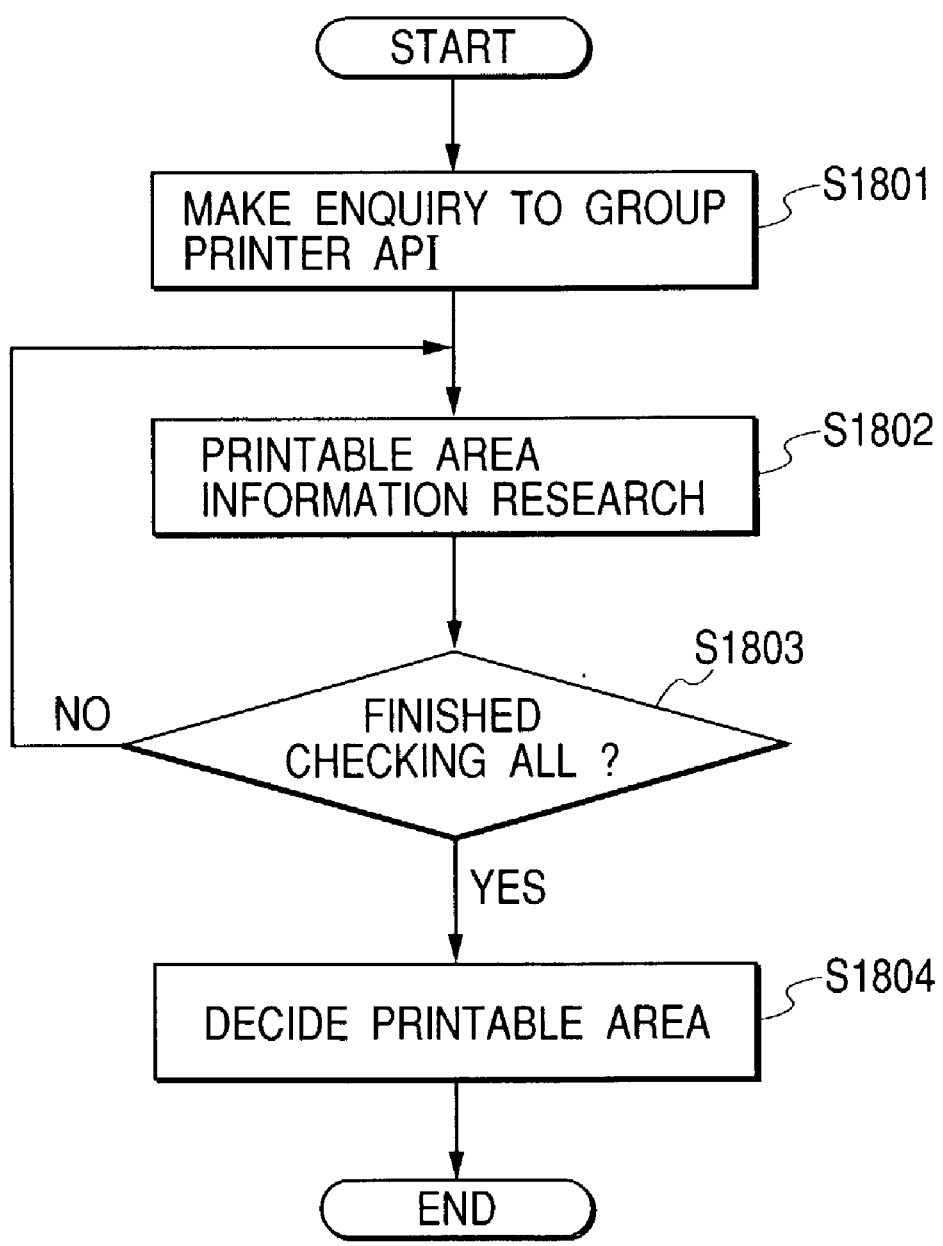
FIG. 18 is a flowchart showing the control on a margin of the group printer driver in the present embodiments.

FIG. 18 is a flowchart showing a process control flow at installation time of a group printer driver to the system of the present invention. The process of each step of the flowchart of FIG. 18 shall be realized in accordance with execution of the process, wherein a CPU (Central Processing Unit) provided in a data processor as described above reads a control program stored in a predetermined recording medium such as ROM, FD, a hard disc (HD) and the like, and executes the process based on the read program.

First, in step S1801, when an installation starts, a member printer name used in the group printer driver is obtained by using a printing job control system API.

In step S1802, based on an ID held by the member printer driver, the information regarding the setting feasible area information of each member printer driver is obtained. Note that the setting feasible area in the present embodiment is referred to as a printable range as to how far the printable area can be specified in one sheet of a recording medium.

Here, the ID of the member printer driver will be described in detail. As the member printer driver ID in the present embodiment, for example, identification information on a name (text data) registered in an icon corresponding to a printer driver, a serial number uniquely allotted to the printer driver and the like, identification information uniquely allotted to a managing table of the registered printer driver and the like are assumed, but any information is applicable if it is the information which can specify each member printer driver.

Further, since a margin value can be calculated from a size of a predetermined recording medium such as a sheet (for example, length×breadth=297×210 (mm) in the case of A4 sheet size) and the information showing a range in which a printing (image formation) is performed and the information regarding the setting feasible area obtained in step S1802 are the information itself showing the margin value, and both this information and the information showing a range where the image formation can be performed for the recording medium of a predetermined size are applicable(for calculation of the margin value?).

In step S1803, the process executed in step S1802 is performed repeatedly for all of the member printers which are targeted.

In step S1804, from the information on the setting feasible area of each member printer driver obtained via the processes of step S1801 to S1803, the optimum printable area is decided in each property of a plurality of member printer drivers.

Note that the optimum setting feasible area decided in step S1804 is held in a predetermined storage portion as a default value and, after that, the process of the flowchart shown in FIG. 9 is terminated.

Figure 23:
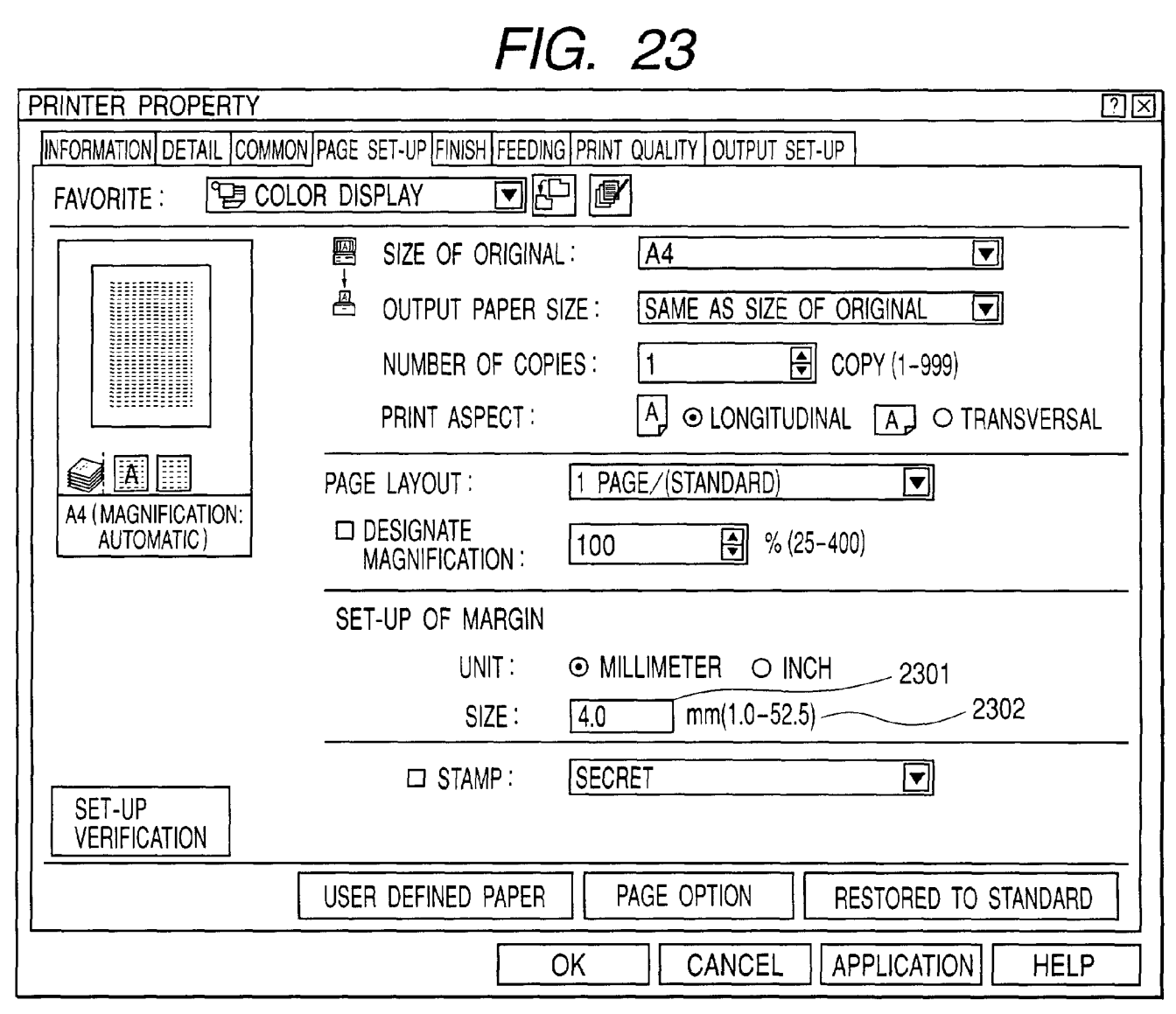

In FIG. 23 is shown one example of the display state of the user interface of the group printer driver. The display of the FIG. 23 is equivalent to a display, which is displayed in a display portion via OS based on image information for displaying the user interface included in a program for printing control (including the group printer driver), and the display in the present embodiment was also displayed by the same arrangement.

This information on the optimum setting feasible area decided in S1804 in FIG. 23 is reflected in the user interface as the default value in a set-up column of the margin of 2301. Further, as still more preferable other embodiment, it is also assumed that the information regarding the decided setting feasible area is reflected in the minimum value of a selectable range (shown as 1.0 to 52.5 mm in 2301) of the margin of 1402, and in this way, the user can be prevented from setting an improper margin value. That is, a result of a conflict process is allowed to be reflected in the minimum value.

As described above, according to the flowchart of FIG. 18, at a point of time when a printing control program of the present invention is installed, the setting feasible area is decided, and further is held as a default set-up, and it is, therefore, possible to correctly reply a value to specify an adequate setting feasible area to a subsequent enquiry from the application.

Further, the control of step S1802 of FIG. 18 may make an enquiry to the member printer driver via the Windows system, or directly make the enquiry to the member printer. Or it is possible to take a constitution, wherein the printable area of each member printer is registered in advance in the printing job control system and the inquiry is made to the printing job control system at the time of the group printer driver installation.

Figure 19:
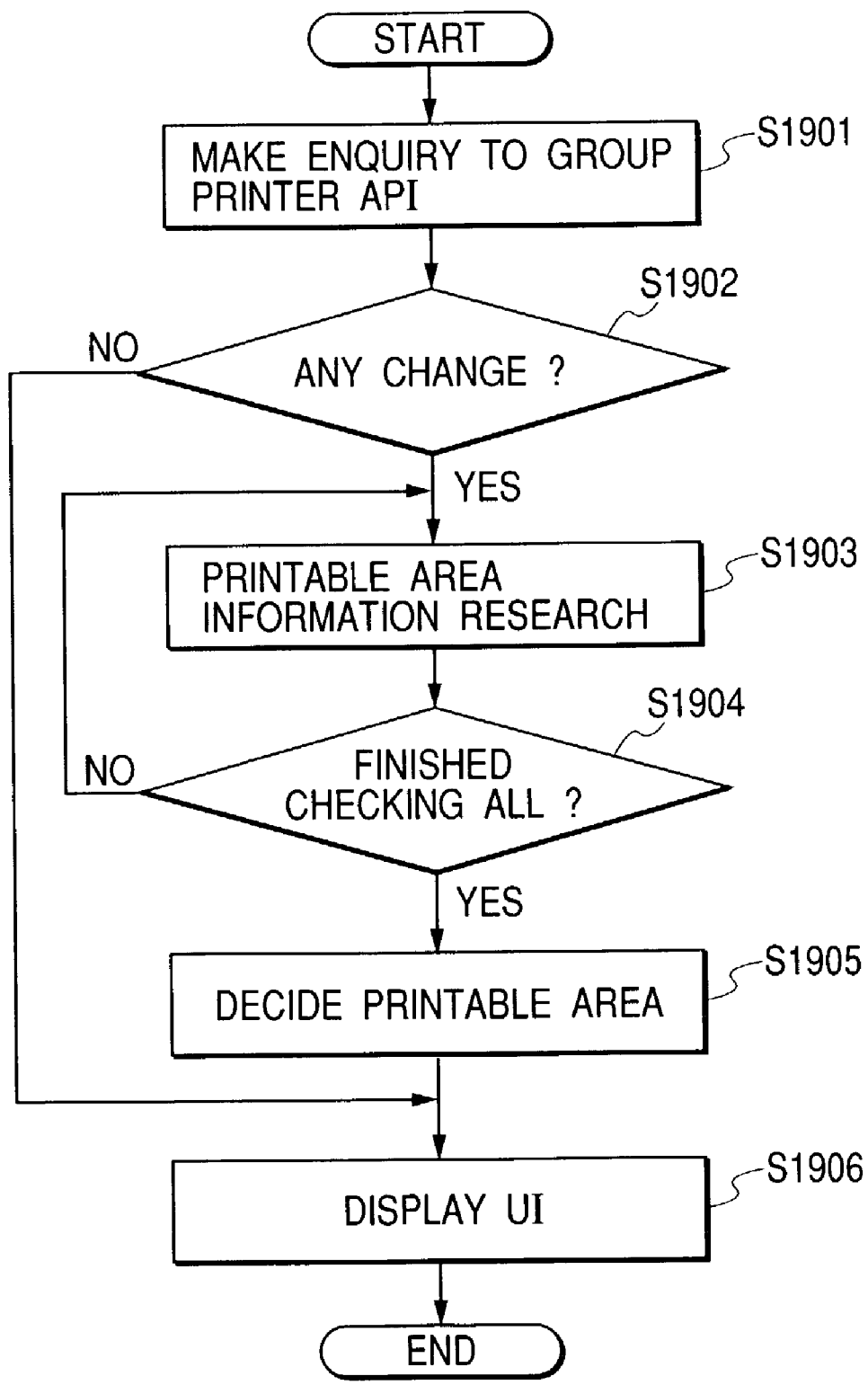
FIG. 19 is a flowchart showing the control at the group printer driver UI display processing time in the present embodiments.

FIG. 19 is a flowchart showing a process control flow at the UI display process time of the group printer driver in the present invention. The process of each step of the flowchart of FIG. 19 shall be realized in accordance with execution of the process, wherein a CPU (Central Processing Unit) provided on the data processor described as above reads a control program stored in a predetermined recording medium such as ROM, FD, a hard disc (HD) and the like, and executes the process based on the read program.

First, in step S1901, when the display of the UI is requested from the application via the Windows System, by using the printing job control system API, acquisition of the ID of the member printer driver used in the group printer driver is performed.

In step S1902, the process which compares each member printer driver ID obtained at this time and the constitution of the member printer driver held in advance by the group printer driver is performed. In other words, a checking process which checks conformity between a plurality of member printer driver IDs obtained last time and a plurality of member printer driver IDs obtained this time is performed.

As a result of the determination of step S1902, in the case where the determination is made that there is no change in the constitution of the member printer driver, the control which performs the display of the user interface is made based on the value of the optimum setting feasible area decided last time in step S1906.

On the other hand, as a result of the determination process in step S1902, in the case where the determination is made that the constitution (a combination of a plurality of member printer driver IDs) of the member printer driver has been changed unlike before, a check of information regarding the setting feasible area is performed again (S1903), which is specifically the same as the process described in the flowchart of FIG. 9, and the process which obtains the setting feasible area information on each member printer driver based on the ID of the member printer driver is performed.

The determination is made as to whether or not the process of S1003 has been performed for all of the member printer drivers (S1904), and when the determination is made that the process has been terminated, the process is allowed to move to step S1905.

In step S1905, the optimum printable area based on the information regarding the setting feasible area of each member printer driver obtained by the process of step S1903 and step S1904 is decided. The information of the optimum setting feasible area decided in step S1905 is held in a predetermined storage portion as the set-up value of the default of the group printer driver and, after that, the control such as displaying the user interface based on the optimum setting feasible area decided in step S1905 is carried out by the printing control program of the present invention (S1906).

Similarly as the case of FIG. 18, by the flowchart of FIG. 19, the user interface as shown in FIG. 23 is displayed. In this case, the information regarding the optimum setting feasible area decided in step S1905 is reflected in the user interface as the default value of the margin. Further, it is also assumed that, as other preferred embodiment, the information regarding the setting feasible area decided to be the smallest value of the selectable range of the margin of 2302 is reflected. In this way, the user can be prevented from setting a setting value regarding an inappropriate margin.

Further, according to the flowchart of FIG. 19, since the control is performed in such manner that the value of 2301 of FIG. 23 or the value of 2302 is also changed and set according to the change in the constitution of the member printer driver, the user can always obtain the information regarding the optimum setting feasible area, no matter how the constitution of the member printer always changes.

According to the process of the flowchart of FIG. 23, since the optimum printable area is decided and is held in a predetermined storage portion as the set-up value of the group printer driver, the optimum printable area can be correctly replied to the subsequent enquiry from the application.

Here, the process of the decision of the optimum setting feasible area of step S1804 or step S1905 will be further described. In step S1804 or step S1905, from the information regarding the obtained setting feasible area of each member printer, the most narrowest width in respect of above and below and right and left, respectively is adopted as a printing width and decided as the optimum printable area. Further, this process is decided for every sheet size as a different printable area.

Note that, if a size of the recording medium and the setting feasible area for that size are decided, a margin value can be clearly decided. That is, the optimum setting feasible area in step S1904 or step 1905 can be also, needles to mention, provided as a margin value.

Fifth Embodiment

In the fourth embodiment, the process such as adopting the narrowest printing area for a predetermined sheet size has been described.

As a deciding method of the optimum setting feasible area apart from this, adopting the most widest area in respect to above and below and right and left, respectively from the obtained setting feasible area of each member printer and taking a constitution of adopting an average value are also assumed in the present invention.

Further, in the case of the constitution having a plurality of setting feasible area deciding methods, the selection method thereof should not be unilaterally decided, but it would be possible to take a constitution where the user is allowed to select by display on the user interface.

Hereinafter, a fifth embodiment will be described with reference to the drawings.

Figure 20:
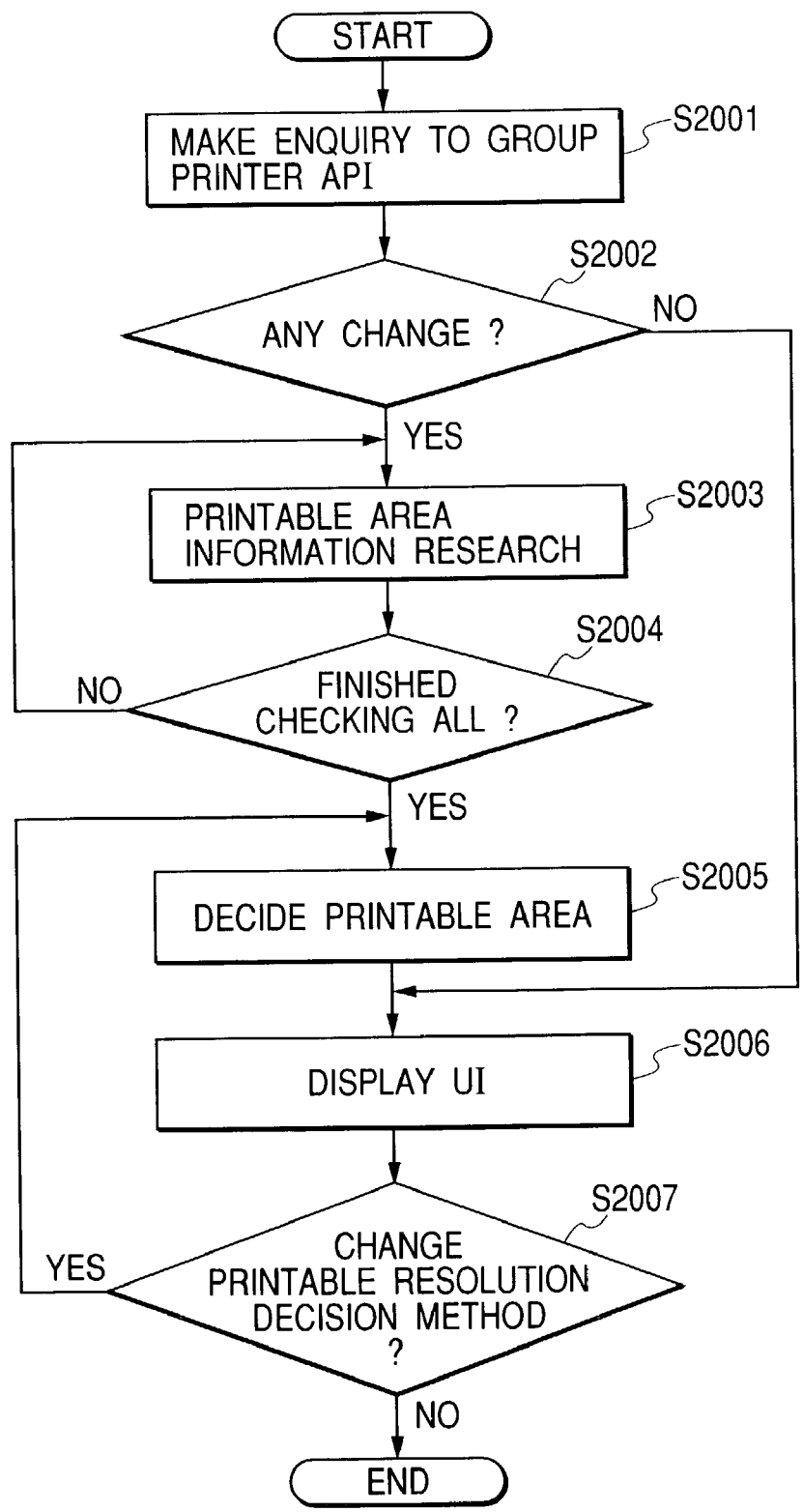
FIG. 20 is a flowchart showing the control on setting feasible area information of the group printer driver in the present embodiments.

FIG. 20 is a flowchart showing a process control flow at the time when the group printer drive UI is displayed. The process of each step of the flowchart of FIG. 20 shall be realized in accordance with execution of the process, wherein a CPU (Central Processing Unit) provided on the data processor described as above reads a control program stored in a predetermined recording medium such as ROM, FD, a hard disc (HD) and the like, and executes the process based on the read program.

First, in step S2001, when the display of the UI is requested from the application via the Windows System, by using the printing job control system API, the ID of each member printer driver which composes the group printer driver is obtained.

In step S2002, a comparison between the constitution of the member printer driver held in advance by the group printer driver and the member printer driver ID obtained in step S2011 is performed.

In the case where the determination is made that no change has been made in step S2002, in step S2016, the display of the user interface to perform various set-up of the group printer driver in which the optimum setting feasible area decided last time is reflected is performed.

Further, as a result of the determination of the comparison in step S2002, in the case where the determination is made that the constitution of the member printer driver is changed, based on the ID of each member printer driver, the setting feasible area information peculiar to each member printer driver is obtained (S2003), and the process of step S2003 is repeatedly performed for all of the member printer drivers (S2004).

Figure 22:
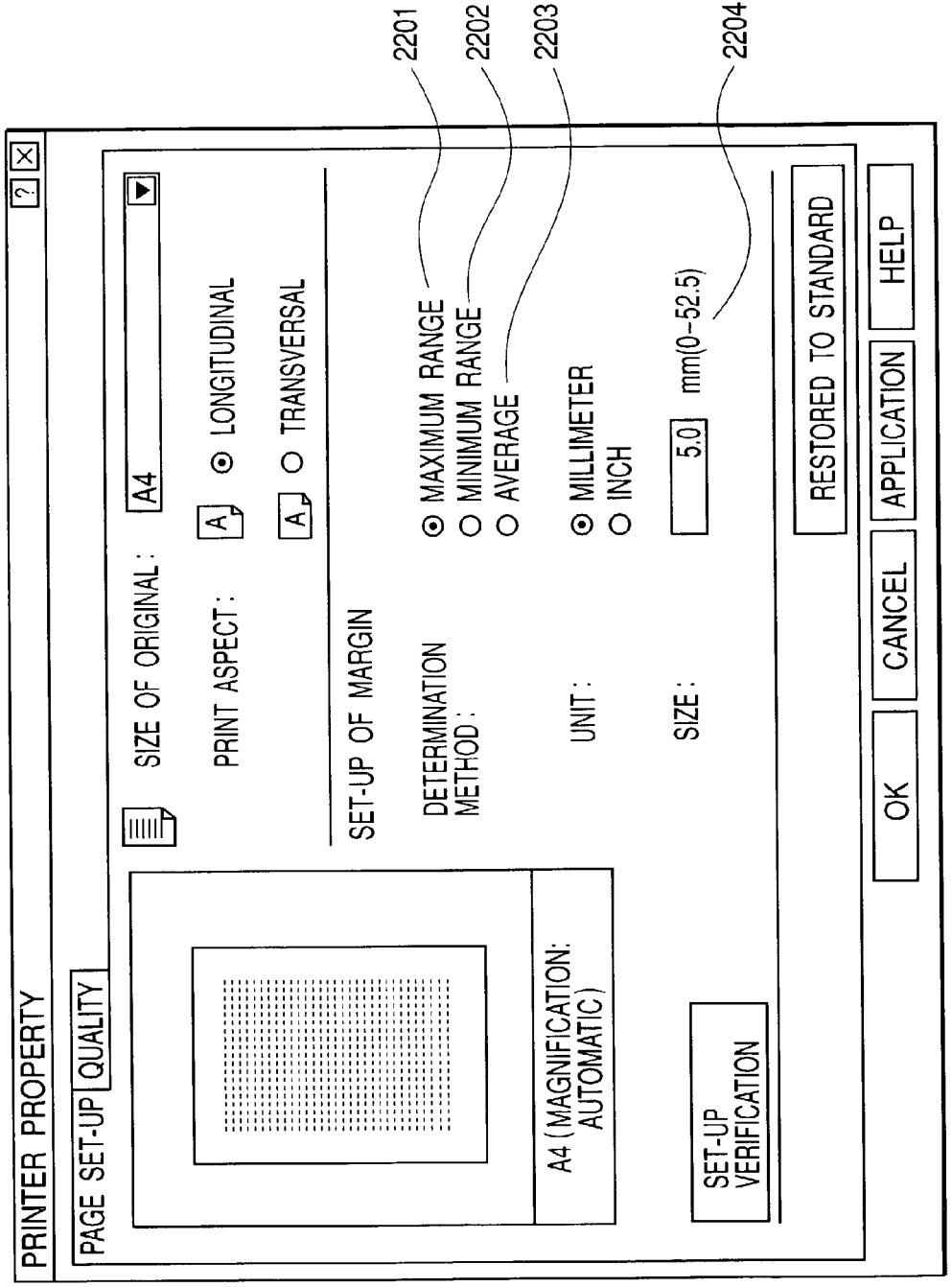
FIG. 22 is one example showing the UI display of the group printer driver in the present embodiments.

Based on the information regarding the setting feasible area of each member printer driver obtained in step S2003 and step S2004 and the optimum setting feasible area deciding method which was instructed last time or in advance via the user interface as shown in FIG. 22, the printable area is decided (S2005).

The control is performed such that the value of the setting feasible area decided in step S2005 is reflected and displayed in the UT of the group printer driver (S2006).

In step S2007, the determination is made as to whether or not the user was instructed to change the setting feasible area deciding method to a predetermined setting feasible area deciding method.

In the case where the recognition is made that the instruction was inputted so as to change the setting feasible area in step S2007, based on the information on the setting feasible area instructed to change and the setting feasible area of each member printer driver obtained in the processes of step S2003 and step 2004, the setting feasible area is decided again (S2005).

In step S2006, the control is performed, wherein the value decided again in step S2005 of the setting feasible area is allowed to be reflected and displayed in the UI of the group printer driver.

Further, in step S2007, in the case where the determination is made that the instruction was not made to change a setting feasible deciding method, the setting feasible area deciding method currently selected and the setting feasible area decided in step S2005 are allowed to be held in a predetermined storage area as a setting value of the group printer driver, and the process thereof is terminated.

In this way, according to the flowchart of FIG. 20, it can be easily realized that the setting feasible area is decided by the setting feasible area deciding method desired by the user.

FIG. 22 shows one example of the UI display in this constitution. The user can select the desired setting feasible area deciding method of 2201 to 2203 via a pointing device such as a mouse. Further, the value of the setting feasible area decided for the change of the setting feasible area deciding method of 2201 to 2203 is reflected and displayed in 2204 as a default value.

Sixth Embodiment

In a sixth embodiment, according to a table of correspondence as shown in FIG. 21, a process will be described, wherein a process method is automatically selected according to which printing a printing job control system 700 performs from among value-added printing such as a proxy printing, a dispersion printing, a broadcast printing and the like.

Hereinafter, the description will be made with reference to FIG. 24.

First, in steps S2401 to S2403, the determination is made as to whether or not the output method currently set is the broadcast printing or the dispersion printing or the color/monochrome printing. In whichever step, in the case where the determination result is No, the determination is made that the output method is a proxy printing. Of course, in the case where there are available more output methods, it is assumed that the determination process regarding various outputs methods as shown in the flow of FIG. 24 and the setting feasible area deciding method corresponding to each output method are applicable.

Further, in the case where the output method set in the group printer driver corresponds to any of the output methods of S2401 to S2403, the "minimum range selection" is adopted as a method of deciding the optimum setting feasible area (S2405).

Here, the method of the "minimum range selection," as described in the first embodiment, is equivalent to the control, wherein the most narrowest width in respect of above and below and right and left, respectively is selected as a printing width for a predetermined sheet size from the information regarding the obtained setting feasible area of each member printer, and this width is tuned into the optimum printable area.

Further, in the case where the determination is made that any of the output methods from step S2401 to step S2403 is not applicable, that is, in the case where the output method currently set is the "proxy printing," the deciding method of the optimum setting feasible area for the proxy destination is such that the same setting feasible area as the setting feasible area set in the representative member is set as an actual setting feasible area for the member printer driver of the proxy destination (S2404).

Here, the representative member printer (representative printer driver) means a representative member printer driver which is the first in the order of priority from among any one of a plurality of member printers set in the order of priority via the user interface, and this is referred to as the representative member printer driver. Although the order of priority is set randomly according to the instruction of the user, at this time, the setting feasible area of the representative member printer driver is set in the setting feasible area of the member printer driver which is the second, the third, the fourth, the Nth . . . as the optimum setting feasible area. Note that, when the optimum setting feasible area is changed, it will be more friendly to the user if in the display portion of the client is allowed to be displayed a warning to the effect that "would it be alright that the calculation method of the optimum setting feasible area be changed?"

Further, the control described in the flowchart of FIG. 24 can be considered as applicable to the step S1804 of FIG. 18 described in the first embodiment or the step S1905 of FIG. 19, and from this, the optimum printable area calculation method is automatically selected according to the output method currently set (the broadcast, dispersion, color/monochrome dispersion printing, the proxy printing and the like).

According to the flowchart of FIG. 24, in the printing process targeted at a plurality of member printer drivers, the deciding method of different optimum setting feasible areas can be selected according to the output method such as the dispersion printing, the proxy printing without any special operations by the user.

Further, the method of calculating different optimum printing areas according to the output methods is not limited to the one shown in FIG. 21, and it is assumed in the present invention that a change can be made, for example, according to the maximum range selection for alternate printing "the minimum range selection" for "the dispersion printing", "the minimum range selection" for "the color/monochrome printing" and "the range average selection" for "the broadcast printing".

Note that the present invention (the first to the sixth embodiments) may be applied to a system constituted by a plurality of equipment (for example, a host computer, an interface equipment, a reader, a printer and the like) or a device comprising one equipment (a copying machine, a printer, a facsimile machine and the like).

Further, the object of the present invention is achieved also by reading and executing a program code stored in the recording medium which stores a program code of the software to realize the functions of the above-described embodiments and the program code which the computer of the system or the equipment (or CPU or MPU) stores in the recording medium.

In this case, the program code itself read from the recording medium realizes the function of the above-described embodiments, and the recording medium which stores that program code or the program code itself composes the present invention.

As the recording medium which provides the program code, as described above, a floppy disc, a hard disc, an optical disc, an photoelectro magnetic disc, MO, CD-ROM, CD-R, DVD, a magnetic tape, a nonvolatile memory card, ROM and the like can be used.

Further, by executing the program code read by the computer, not only the above-described embodiments are realized, but there are some cases involved also where, based on the instruction of the program code, an OS (operating system) operated on the computer and the like performs a part or all of the actual process, and by the process thereof, the functions of the above-described embodiments are realized.

Further, there are some cases involved also where, after the program code read from the recording medium is written in a memory provided for an extension board inserted into the computer or an extension unit connected to the computer, based on the instruction of that program code, a CPU provided for the expanded capability board or the expanded capability unit performs a part or all of the actual process, and by the process thereof, the functions of the above-described embodiments are realized.

As described above by the first to the sixth embodiments, performing the printing in the printing set-up (printing area) which is guaranteed for the normal printing in all of plurality of connected printers is effectively realized without the user forced into complicated operations.

Further, by taking the optimum common printing set-up extracting method (setting feasible area deciding method) for every operating set-up of the printing job control system, the optimum setting feasible area can be automatically set by matching the setting feasible area with the object of the printing job control.

Further, by comprising the user interface which is possible to clearly instruct the printing set-up (setting feasible area), a set-up method of the printing set-up (set-up of the setting feasible area) can be provided also for the user who is not satisfied with the printing set-up (setting feasible area) automatically decided.

In the practical set-up of the setting feasible area, by displaying the setting feasible area decided by the setting feasible area deciding method as a regular value, an adequate setting feasible area set-up can be provided without causing to the user a trouble of selecting again. Further, with respect to a range where the setting is not possible by any printer, a lack of setting result can be prevented by a mistake by not allowing the display and the selection to be made.

Further, in the case where the printing of the dispersion, the broadcast, the proxy and the like is performed using painters, the arrangement can be provided where the set-up taking into consideration the performance (setting feasible area) peculiar to each printer is collectively performed.

Further, since the optimum printing set-up (setting feasible area) can be provided to the user, there is no more need for the user to check the set-up feasible item (setting feasible area) of each printer and set the same printing set-up (printing area) for the individual printers or-the individual printer drivers within a setting feasible range by all of the printers.

Further, in the case also where, based on the printing instruction to a plurality of connected printers, the setting area such as a margin is set by a virtual printer driver which brings together each printer, since the optimum printable area can be grasped in advance, a situation such as the development of a lack of setting by other printer has come to be preventable.

Furthermore, in the printing process by the virtual printer which supports a plurality of output methods (dispersion printing/color monochrome printing/broadcast printing/proxy printing), even when a combination of a plurality of member printers is changed according to the change in the output methods, the optimum printing set-up (printable area) corresponding to the change has come to be providable to the user.

What is claimed is:

1. A controller which controls a group printer virtually composed of a plurality of member printers, wherein the controller is constructed to instruct use of at least one of the plurality of member printers in a plurality of output methods which include at least proxy printing in which a document sent to one printer is printed by another printer when an error occurs in the printer and distribution printing in which one document is distributed to a plurality of printers by a page unit for printing therein, wherein controller comprises:

a recognizing unit that recognizes which one of the plurality of output methods is instructed;

a determination unit that determines, based on identification information of the group printer and identification information of the plurality of member printers, whether constitution of the plurality of member printers is changed;

an obtaining unit that obtains information on a printing resolution held by each of the plurality of member printers;

a first deciding unit that decides, based on the information obtained by the obtaining unit, the printing resolution of a representative member printer among the plurality of the member printers as the printable resolution of the group printer when the recognizing unit recognizes that the proxy printing is instructed;

a second deciding unit that decides, based on the information obtained by the obtaining unit, a common printing resolution held by the plurality of member printers as the printable resolution of the group printer when the recognizing unit recognizes that the distribution printing is instructed, wherein the second deciding unit further decides a predetermined printing resolution as a default printing resolution of the group printer in the case where a plurality of common printable resolutions are extracted from among the plurality of member printers;

a user interface control unit that controls a user interface of the group printer to reflect the printable resolution decided by the first deciding unit when the recognizing unit recognizes that the proxy printing is instructed, and controls the user interface of the group printer to reflect the printable resolution and the default printing resolution decided by the second deciding unit when the recognizing unit recognizes that the distribution printing is instructed; and a printing control unit that controls printing based on a printing resolution designated via the user interface controlled by the user interface control unit, wherein, when the determination unit determines that the constitution of the plurality of member printers is not changed, the obtaining unit does not obtain the information on the printing resolution held by each of the plurality of member printers and the user interface control unit controls the user interface of the group printer to reflect information previously decided by the first deciding unit or the second deciding unit.

2. The controller according to claim 1, wherein the plurality of output methods further include color/monochrome distribution printing.

3. The controller according to claim 1, further comprising a specifying unit that specifies the plurality of member printers constituting the group printer.

4. The controller according to claim 3, wherein the specifying unit specifies each of the plurality of member printers based on checking names allotted to the member printers.

5. A method for controlling a group printer, wherein the group printer is virtually composed of a plurality of member printers, wherein use of at least one of the plurality of member printers is instructable in a plurality of output methods which include at least proxy printing in which a document sent to one printer is printed by another printer when an error occurs in the printer and distribution printing in which one document is distributed to a plurality of printers by a page unit for printing therein, wherein the method comprises:

a recognizing step of recognizing which one of the plurality of output methods is instructed;

a determination step that determines, based on identification information of the group printer and identification information of the plurality of member printers, whether constitution of the plurality of member printers is changed;

an obtaining step of obtaining information on a printing resolution held by each of the plurality of member printers;

a first deciding step of deciding, based on the information obtained by the obtaining step, the printing resolution of a representative member printer among the plurality of the member printers as the printable resolution of the group printer when it is recognized in the recognizing step that the proxy printing is instructed;

a second deciding step of deciding, based on the information obtained by the obtaining unit, a common printing resolution held by the plurality of member printers as the printable resolution of the group printer when it is recognized in the recognizing step that the distribution printing is instructed, wherein the second deciding step further decides a predetermined printing resolution as a default printing resolution of the group printer in the case where a plurality of common printable resolutions are extracted from among the plurality of member printers;

a user interface control step of controlling a user interface of the group printer to reflect the printable resolution decided in the first deciding step when it is recognized in the recognizing step that the proxy printing is instructed, and controlling the user interface of the group printer to reflect the printable resolution and the default printing resolution decided in the second deciding unit when it is recognized in the recognizing step that the distribution printing is instructed; and a printing control step of controlling printing based on a printing resolution designated via the user interface controlled in the user interface control step, wherein, when the determination step determines that the constitution of the plurality of member printers is not changed, the obtaining unit does not obtain the information on the printing resolution held by each of the plurality of member printers and the user interface control unit controls the user interface of the group printer to reflect information previously decided by the first deciding unit or the second deciding unit.

6. The method according to claim 5, wherein the plurality of output methods further include color/monochrome distribution printing.

7. The method according to claim 5, further comprising a specifying step of specifying the plurality of member printers constituting the group printer.

8. The method according to claim 7, wherein, in the specifying step, each of the plurality of member printers is specified based on checking names allotted to the member printers.

9. A non-transitory computer-readable memory medium storing a computer program executable by a controller to control a group printer, wherein the group printer is virtually composed of a plurality of member printers, wherein the controller is constructed to instruct use of at least one of the plurality of member printers in a plurality of output methods which include at least proxy printing in which a document sent to one printer is printed by another printer when an error occurs in the printer and distribution printing in which one document is distributed to a plurality of printers by a page unit for printing therein, wherein the computer program comprises:

a recognizing step of recognizing which one of the plurality of output methods is instructed;

a determination step that determines, based on identification information of the group printer and identification information of the plurality of member printers, whether constitution of the plurality of member printers is changed;

an obtaining step of obtaining information on a printing resolution held by each of the plurality of member printers;

a first deciding step of deciding, based on the information obtained by the obtaining step, the printing resolution of a representative member printer among the plurality of the member printers as the printable resolution of the group printer when it is recognized in the recognizing step that the proxy printing is instructed;

a second deciding step of deciding, based on the information obtained by the obtaining step, a common printing resolution held by the plurality of member printers as the printable resolution of the group printer when it is recognized in the recognizing step that the distribution printing is instructed, wherein the second deciding step further decides a predetermined printing resolution as a default printing resolution of the group printer in the case where a plurality of common printable resolutions are extracted from among the plurality of member printers;

a user interface control step of controlling a user interface of the group printer to reflect the printable resolution decided in the first deciding step when it is recognized in the recognizing step that the proxy printing is instructed, and controlling the user interface of the group printer to reflect the printable resolution and the default printing resolution decided in the second deciding unit when it is recognized in the recognizing step that the distribution printing is instructed; and a printing control step of controlling printing based on a printing resolution designated via the user interface controlled in the user interface control step, wherein, when the determination step determines that the constitution of the plurality of member printers is not changed, the obtaining step does not obtain the information on the printing resolution held by each of the plurality of member printers and the user interface control step controls the user interface of the group printer to reflect information previously decided by the first deciding step or the second step.

10. The non-transitory computer-readable memory medium according to claim 9, wherein the plurality of output methods further include color/monochrome distribution printing.

11. The non-transitory computer-readable memory medium according to claim 9, wherein the program further comprises a specifying step of specifying the plurality of member printers constituting the group printer.

12. The non-transitory computer-readable medium according to claim 11, wherein, in the specifying step, each of the plurality of member printers is specified based on checking names allotted to the member printers.

* * * * *